(12) United States Patent
Gardner et al.

(10) Patent No.: US 10,692,060 B2
(45) Date of Patent: Jun. 23, 2020

(54) PRODUCT BASED GIFT CARD

(71) Applicant: CashStar, Inc., Waltham, MA (US)

(72) Inventors: Daniel P. Gardner, Westford, MA (US); Gerard R. Gilbert, Windham, NH (US); Shaun D. White, Portland, ME (US); Benjamin H. Kaplan, Lexington, MA (US)

(73) Assignee: CASHSTAR, INC., Portland, ME (US)

( * ) Notice: Subject to any disclaimer, the term of this patent is extended or adjusted under 35 U.S.C. 154(b) by 242 days.

(21) Appl. No.: 15/816,157

(22) Filed: Nov. 17, 2017

(65) Prior Publication Data

US 2018/0144313 A1 May 24, 2018

Related U.S. Application Data

(60) Provisional application No. 62/424,203, filed on Nov. 18, 2016.

(51) Int. Cl.
*G06Q 30/00* (2012.01)
*G06Q 20/12* (2012.01)
*G06Q 20/34* (2012.01)
*G06Q 20/38* (2012.01)

(52) U.S. Cl.
CPC .......... *G06Q 20/12* (2013.01); *G06Q 20/342* (2013.01); *G06Q 20/351* (2013.01); *G06Q 20/354* (2013.01); *G06Q 20/387* (2013.01)

(58) Field of Classification Search
None
See application file for complete search history.

(56) References Cited

U.S. PATENT DOCUMENTS

| | | | | |
|---|---|---|---|---|
| 2013/0290203 A1* | 10/2013 | Purves | .................. | G06Q 50/01 705/319 |
| 2013/0297493 A1* | 11/2013 | Linden | .................. | G06Q 20/28 705/39 |
| 2014/0207610 A1* | 7/2014 | Erez | .................. | G06Q 30/0633 705/26.7 |
| 2014/0304171 A1* | 10/2014 | Mertens | ............ | G06Q 30/0641 705/71 |
| 2016/0232480 A1* | 8/2016 | Erez | ...................... | G06Q 10/087 |
| 2016/0292671 A1* | 10/2016 | Manno | ................ | G06Q 20/342 |

* cited by examiner

*Primary Examiner* — Mila Airapetian
(74) *Attorney, Agent, or Firm* — Panitch Schwarze Belisario & Nadel LLP

(57) ABSTRACT

A method for allowing a purchaser to purchase an electronic gift includes providing code to a merchant that, when selected opens an overlay on the merchant's website, with the code being selected in association with at least one item available for sale on the website. The purchaser provides recipient and billing information using a device accessing he overlay. A service provider receives payment, in an amount at least equal to a purchase price of the item, and obtains an electronic gift card having at least a unique gift card number and a balance at least equal to the purchase price of the item. After the electronic gift card has been obtained, the service provider electronically notifies the recipient that the electronic gift has been purchased by the purchaser. The notification is viewable by the recipient and includes at least an identification of the item.

11 Claims, 30 Drawing Sheets

Fig. 20

PRODUCT BASED GIFT CARD

CROSS-REFERENCE TO RELATED APPLICATIONS

This application claims the benefit of U.S. Provisional Patent Application No. 62/424,203, filed on Nov. 18, 2016, entitled, "Product Based Gift Card Method and System,", the entire contents of which are incorporated by reference herein.

BACKGROUND OF THE INVENTION

Embodiments of the present invention relate generally to online transactions, and more particularly, to online transaction involving eGift Card purchase and redemption.

Some online merchants currently offer the ability to purchase an item as an "eGift." That is, the purchaser selects and pays for an item on the merchant's website, but rather than retrieving the product from inventory and shipping the item to the intended recipient, the recipient is notified, usually via email, that a gift has been selected. It is then up to the recipient to claim the gift. The benefit of this method is that if the recipient does not like the item selected by the purchaser, the recipient can convert the item into a gift card for the same value, e.g., similar to an exchange at a brick-and-mortar store, and select something else offered for sale by the merchant. In most instances, a service provider separate from the merchant provides the eGift service.

There are several drawbacks to such eGift systems. First, when the purchaser pays for the gift, payment is made to the service provider, who in turn places the funds in an escrow account. The funds are maintained in the escrow account until the recipient claims the gift or opts for the eGift card. Only then are the funds released and an eGift card is obtained from the merchant's preferred gift card processor. Thus, nothing is actually purchased when the gift is initially selected by the purchaser. This delays revenue to the merchant and presents significant security risks.

Additionally, the service provider techniques require deep integration with the merchant's inventory, pricing, fulfillment, and order management systems. This is primarily due to the fact that the recipient redemption process takes place entirely within the service provider's interface. That is, when the recipient opts to claim the gift, the recipient is not taken to the merchant's website, but instead to the service provider's interface. For example, when the recipient is prompted to select a color, size, or the like for the gift, the service provider interface must ensure that the selected options are available via the merchant's inventory system. The same is true for pricing and order of the gift as well, i.e., the system provider interface must obtain this information from the merchant. In addition, purchase selections may actually put a hold on inventory at the merchant. This technique requires unnecessary integration processes, creates the potential for technical failures, and renders customer care for products inconsistent.

Still further, with the purchase and redemption actions all occurring within the service provider's interface, it is the branding of the service provider which is typically most prominently featured during eGift processes. This can lead to confusion for the purchasers/recipients, who may not be expecting that their eGift procedure would be taking them to a third party site.

It is therefore desirable to provide an eGift Card method and system that immediately activates an eGift Card upon purchase and does not delay the merchant's revenue stream, that does not require significant integration into the merchant's inventory, pricing, and order management systems, and which keeps the purchaser and recipient within the merchant's environment.

BRIEF SUMMARY OF THE INVENTION

Briefly stated, an embodiment of the present invention comprises a method for allowing a purchaser to purchase an electronic gift for a recipient. The method includes providing, by a service provider, code to a merchant that, when selected by the purchaser using a purchaser device, opens an overlay on a website of the merchant. The code is selected in association with at least one item available for sale on the merchant website. The service provider receives information about the recipient, including at least an email address of the recipient. The information about the recipient is provided by the purchaser using the purchaser device accessing the overlay. The service provider receives billing information, including at least electronic payment information. The billing information is provided by the purchaser using the purchaser device accessing the overlay. The service provider receives payment, in an amount at least equal to a purchase price of the at least one item, based on the billing information, and obtains from a gift card processor, an electronic gift card having at least a unique gift card number and a balance at least equal to the purchase price of the at least one item. After the electronic gift card has been obtained, the service provider electronically notifies the recipient that the electronic gift has been purchased by the purchaser. The notification is viewable by the recipient on a recipient device and including at least an identification of the at least one item.

BRIEF DESCRIPTION OF THE SEVERAL VIEWS OF THE DRAWINGS

The following detailed description of preferred embodiments of the invention will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings:

FIG. 20 is a screenshot of a notification email sent to a gift recipient presenting multiple gifts in accordance with a preferred embodiment of the present invention;

DETAILED DESCRIPTION OF THE INVENTION

Figure 1:
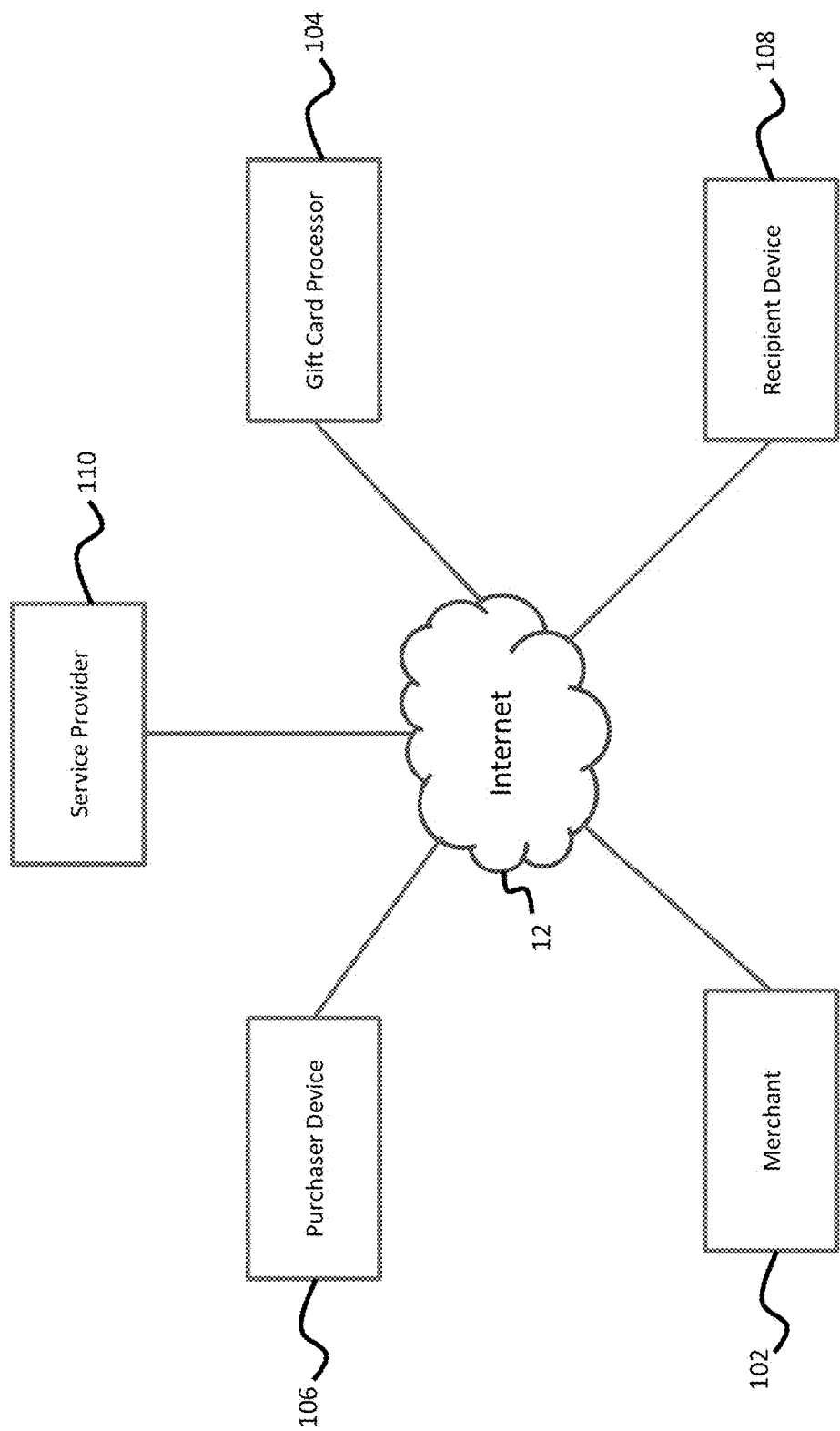
FIG. 1 is a schematic block diagram of a system in accordance with a preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

Referring to FIG. 1, there is shown a schematic block diagram of various components utilized to perform methods in accordance with the present invention. A merchant 102 provides items for sale, preferably at least through a website accessible over the Internet 12. The merchant 102 preferably utilizes one or more servers and/or storage devices and the like that store and track inventory, sales information, customer data, and the like. Such systems are generally not accessible over the Internet 12, at least not by consumers, but can provide information as needed to facilitate transactions made over the website. The necessary systems may be centrally located, remotely located, combinations thereof, or the like, and may be maintained by the merchant 102 itself or by third parties. The merchant 102 may also host the website on its own servers or have it hosted by a third party.

The merchant 102 will typically have an association with one or more gift card processors 104, which creates and tracks eligible gift card numbers, codes, and/or PINs on behalf of the merchant 102. The gift card processor 104 further tracks any balance associated with eligible gift card numbers. The gift card processor 104 therefore preferably utilizes one or more servers and/or storage devices or the like to collect, store, and communicate the necessary information, as requested. The gift card processor 104 can be part of or the same as the merchant 102, as some merchants 102 handle all of their gift cards internally, rather than passing the responsibility to a third party.

A purchaser accesses the website of the merchant 102 using a purchaser device 106 connected to the Internet 12. Similarly, a recipient utilizes a recipient device 108 to connect to the website over the Internet 12. The purchaser device 106 and recipient device 108 may each be a mobile device, such as a smartphone, PDA, tablet computer, laptop computer, or the like, a desktop computer, a kiosk, or the like. The website is preferably accessed using secure hypertext transfer protocol (https) or another like secure type of connection.

A service provider 110 includes one or more servers and/or storage devices or the like to facilitate the eGift card transaction from start to finish. As explained in more detail below, the service 110 provider supplies the necessary coding and interface to complete the purchase of the eGift card, processes and accepts payment from the purchaser, notifies the purchaser and recipient regarding various aspects of the transaction, supplies the eGift card information to the merchant 102 during redemption, and performs other actions necessary to complete and support the method.

While the merchant 102, gift card processor 104, purchaser device 106, recipient device 108, and service provider 110 are all shown in FIG. 1 communicating over the Internet 12, preferably using secure protocols, various communications occurring during the transaction may take place over other communication networks. For example, the service provider 110 and the gift card processor 104 may be directly connected over a private network, or the like. In any event, the particular communication channels used among the various components to complete the transaction are not critical to the various embodiments of the present invention.

Figure 2A:
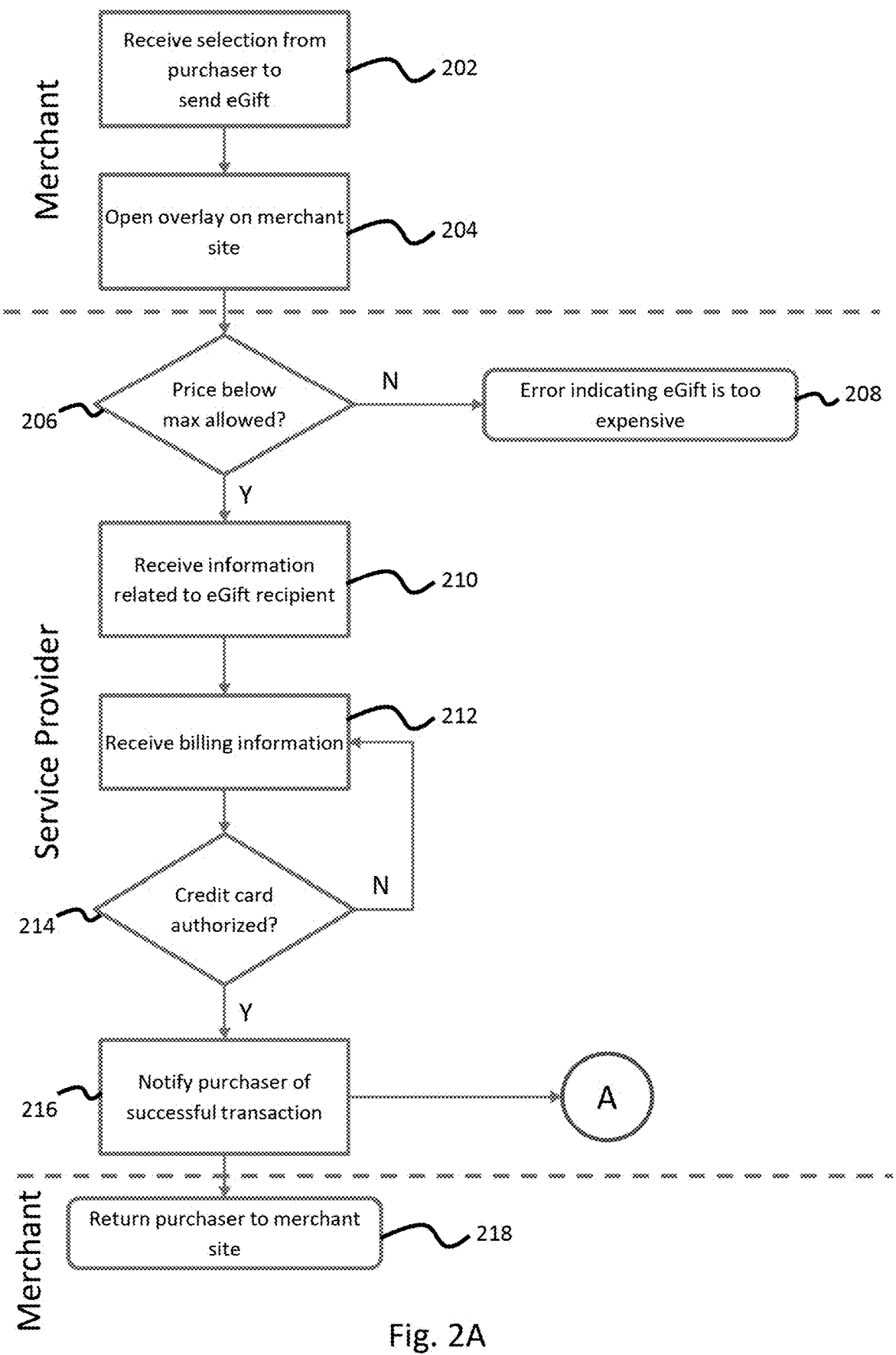
FIGS. 2A and 2B are flow diagrams illustrating a method of purchasing an eGift in accordance with a preferred embodiment of the present invention.
Figure 4:
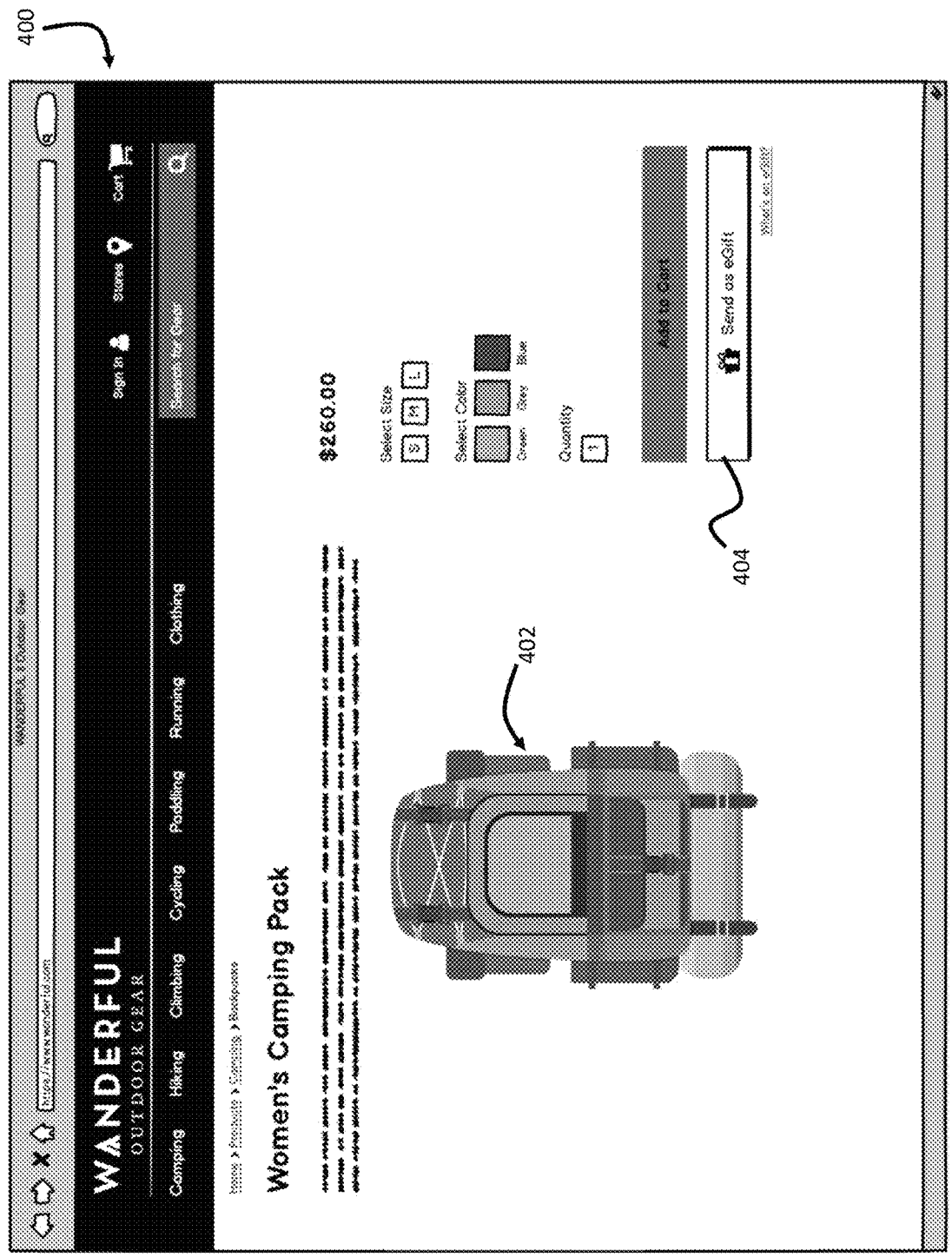
FIG. 4 is a screenshot of a merchant website in accordance with a preferred embodiment of the present invention.

With reference to FIGS. 1, 2A, and 4, a purchaser uses the purchaser device 106 to access a merchant website 400 and locates an item 402 to be purchased. The merchant website 400, in addition to the conventional options provided for purchasing the item 402, includes a link or button 404 listing the option to send the item 402 as an eGift. Should the purchaser click on the button 404, the merchant 102 receives the selection at step 202. The button 404 preferably triggers code leading to step 204 to open an overlay on the merchant website 400 in which the purchase of the eGift will ultimately be completed. As shown in FIG. 2A, the subsequent steps involving the overlay are processed by the service provider 110, rather than the merchant 102. However, as seen in the figures, it is preferred that the overlay contain the merchant's branding and appear as part of the merchant's website 400, to alleviate confusion to the purchaser. To that end, to the extent that a service provider 110 partners with multiple merchants 102, different overlays can be custom designed for each merchant 102.

Figure 5:
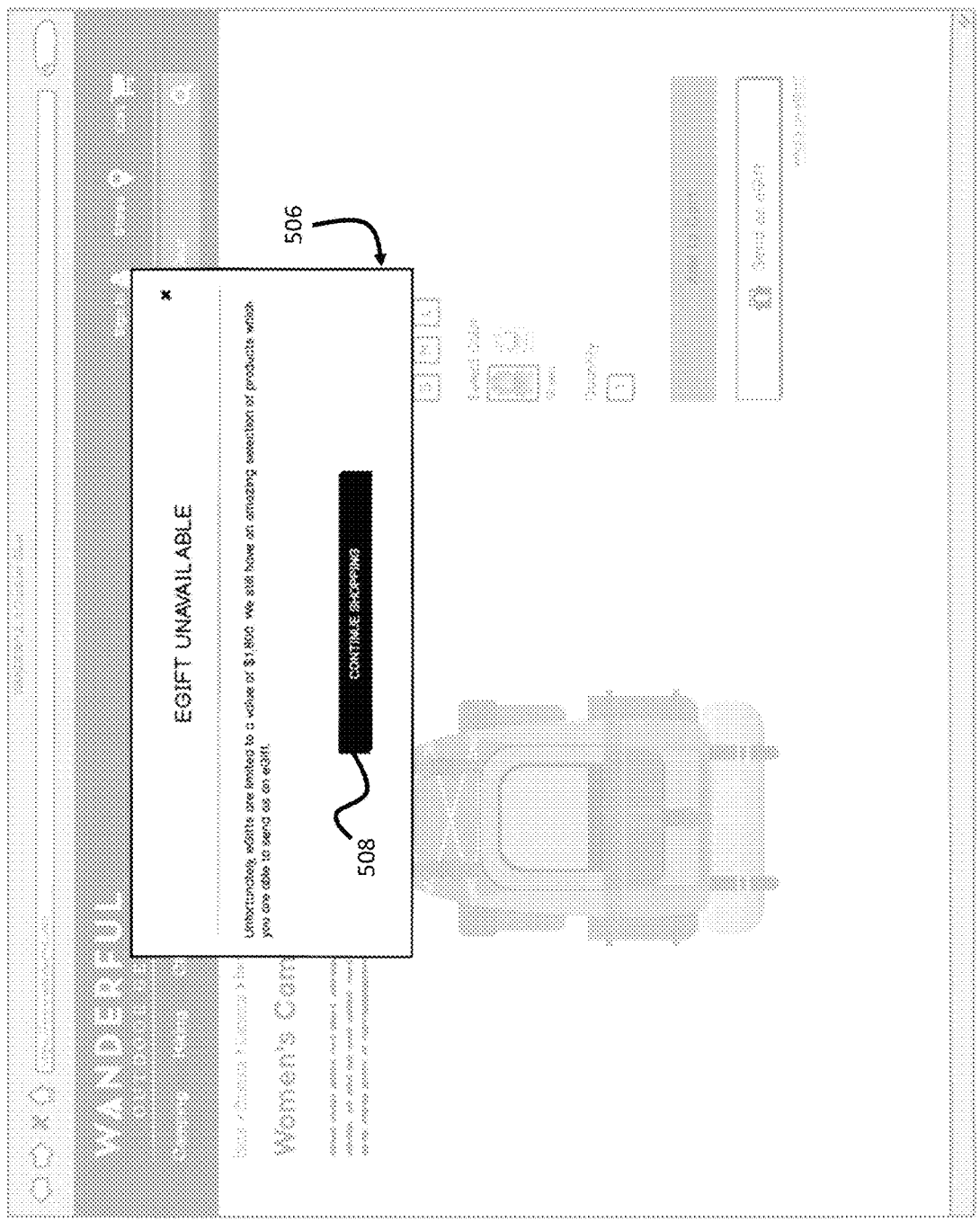
FIG. 5 is a screenshot of an error message in accordance with a preferred embodiment of the present invention.

At step 206, the service provider 110 preferably checks to determine whether the price of the item 402 to be gifted is below a maximum value. For example, the merchant 102 may have a policy governing the maximum allowed price of a gift or gift card. In other embodiments, the maximum amount may be set as the Financial Crimes Enforcement Network (FINCEN) anonymous online transaction limit (currently at $2,000). Other like limits may be similarly set in place prior to allowing the transaction to continue, if desired. If the limit is exceeded, at step 208, an error is provided to the purchaser, such as the error message 506 shown in FIG. 5. Preferably, the purchaser is provided with the option 508 to continue shopping, which takes the purchaser back to the website 400. Alternatively, if the price of the item 402 does not exceed the set limit, the method proceeds to step 210, where a recipient information form 610 (FIG. 6) is preferably provided for the purchaser to complete. The recipient information form 610 may include text boxes for receiving the recipient's name 612, contact information 614 (e.g., email address for gift delivery), the purchaser's name 616, a personalized message 618, and the like.

Figure 6:
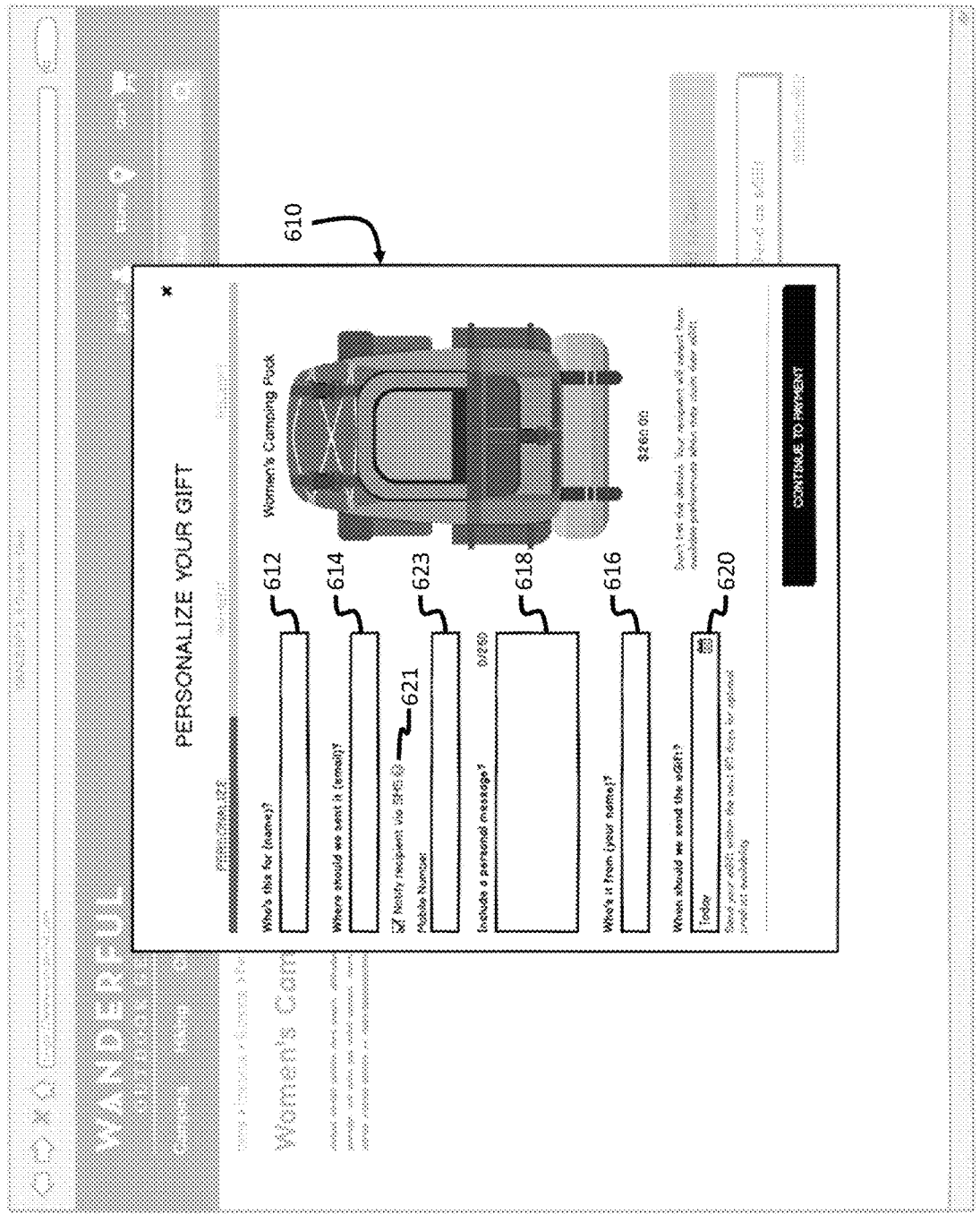
FIG. 6 is a screenshot of a recipient information form in accordance with a preferred embodiment of the present invention.

While email is the preferred method for sending a notification to the gift recipient, some embodiments, the purchaser may also be able to send a notification to the recipient by methods other than email, such as by short message service (SMS), social media, or the like. In FIG. 6, the user is provided with a checkbox 621 indicating that the recipient should also be notified via SMS. A text box 623 is preferably provided to allow entry of the recipient's mobile telephone number. The mobile number box 623 may be greyed out or invisible until the purchaser checks the SMS box 621. In this embodiment, the SMS notification supplements the email notification to the recipient. However, in other embodiments, SMS may be the sole notification method, or one of several choices for the sole notification method.

In some embodiments, the recipient information form 610 can include an input for receiving a date 620 on which the recipient is to be notified of the eGift. This allows for the purchase of gifts in advance of special events, such as the recipient's birthday, and allowing delayed delivery. However, it is preferred that limits be placed on how far ahead of the delivery date the eGift may be purchased. For example, the limit can be predetermined (e.g., 60 days) or can be variable depending on the item to be purchased, such as where the item is seasonal or in limited supply which may be exhausted within 30 days or the like.

Figure 7A:
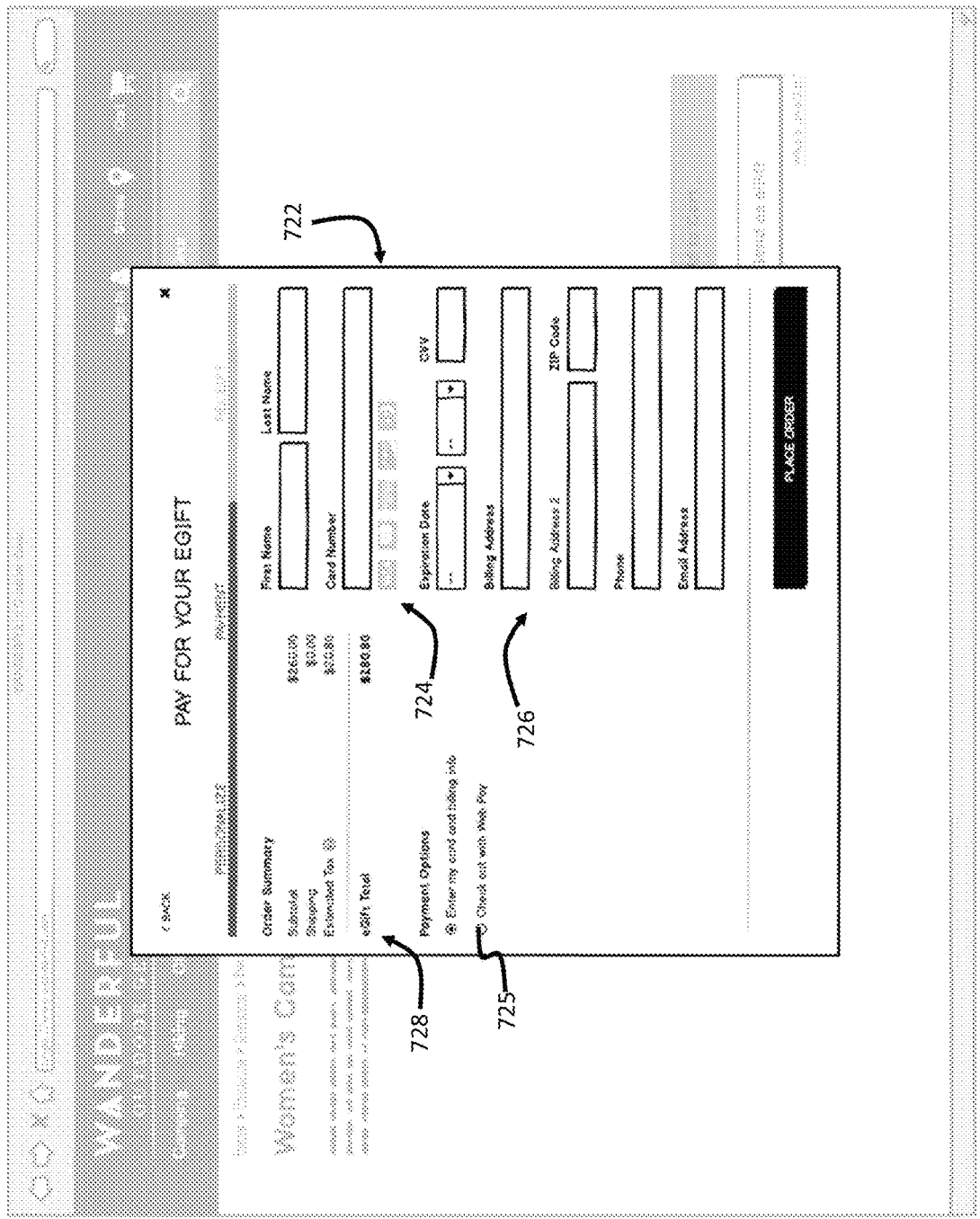
FIG. 7A is a screenshot of a billing information form in accordance with a preferred embodiment of the present invention.

Once the appropriate recipient information has been received from the purchaser device 106, billing information is received at step 212, preferably via a billing information form 722 (FIG. 7). The billing information form 722 preferably includes inputs to receive credit card information 724, billing address 726 or the like for purposes of payment. The billing information form 722 can also preferably provide a link 725 to online payment systems, such as PAYPAL or other like systems for providing electronic payment information, for faster billing entry.

Figure 7B:
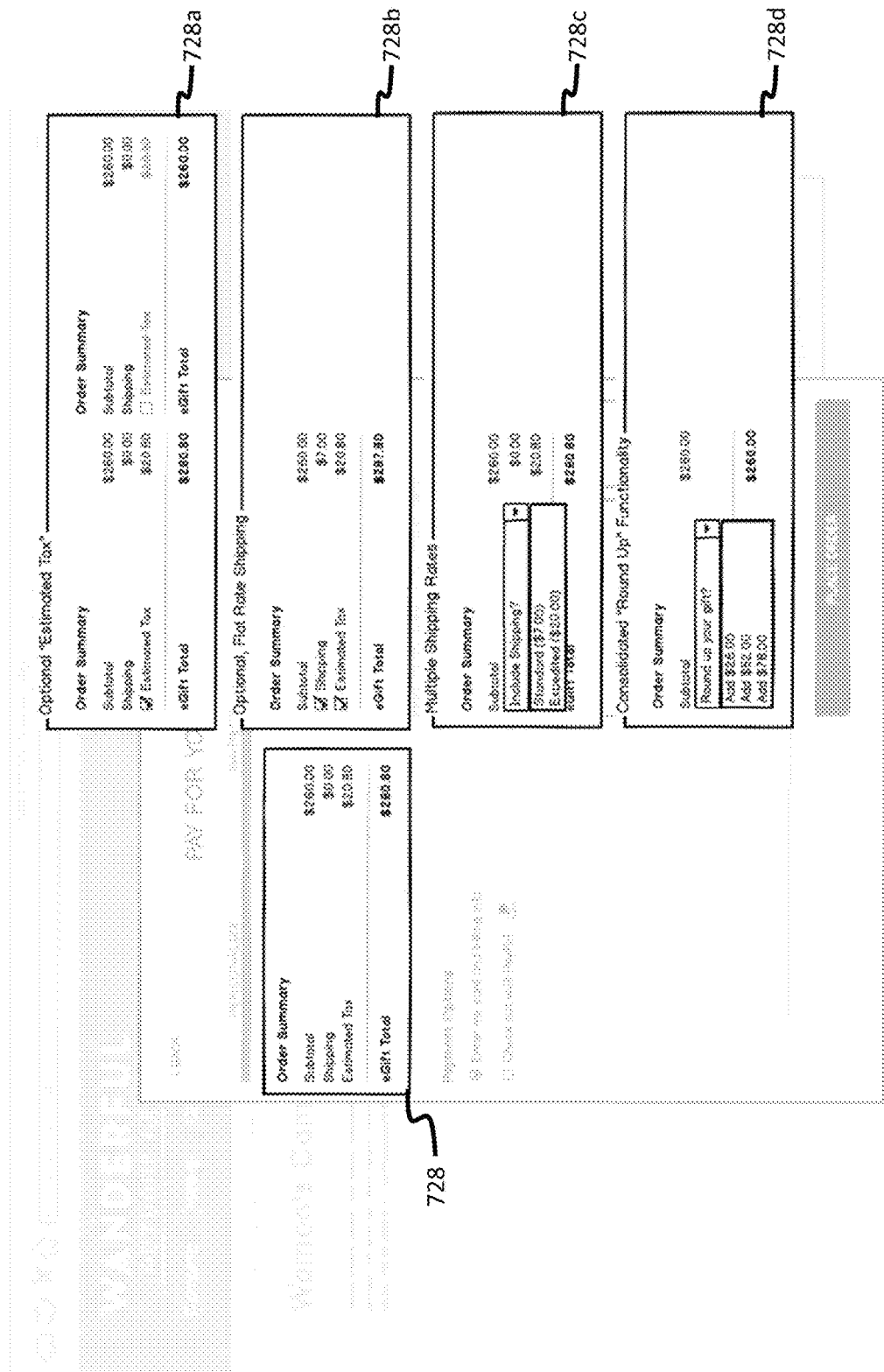
FIG. 7B is a screenshot of various optional modules that may be used with the billing information form of FIG. 7A.

The billing information form 722 preferably also provides an order summary. In the present embodiment, the eGift total is summation of the product purchase price, shipping (in this case no shipping cost is provided), and an estimated tax on the purchase, and the purchaser is covering this total amount. However, the purchaser may be given the option as to whether to cover taxes and/or shipping for the gift, which will ordinarily depend on the recipient's residence. In FIG. 7B, for example, multiple alternative versions of the order summary table 728a-728d are shown. In the first order summary table 728a, the purchaser can select whether the eGift price should include the estimated tax for the purchase. In the second order summary table 728b, the user may individually select whether to cover the estimated tax and a flat shipping rate for the item. In the third order summary table 728c, the purchaser can select from multiple different shipping rates, such as standard, expedited, or the like, which would then be covered by the eGift. In the fourth order summary table 728d, the user is provided a simpler option of rounding up the eGift total by fixed amounts, which may be used to cover shipping and taxes, or could be used by the recipient to purchase additional product, if desired. It should be noted that the options presented in FIG. 7B are not exhaustive, and other forms and iterations for allowing the purchaser to pay for some or all of estimated taxes and/or shipping costs are within the scope of the invention.

Figure 8A:
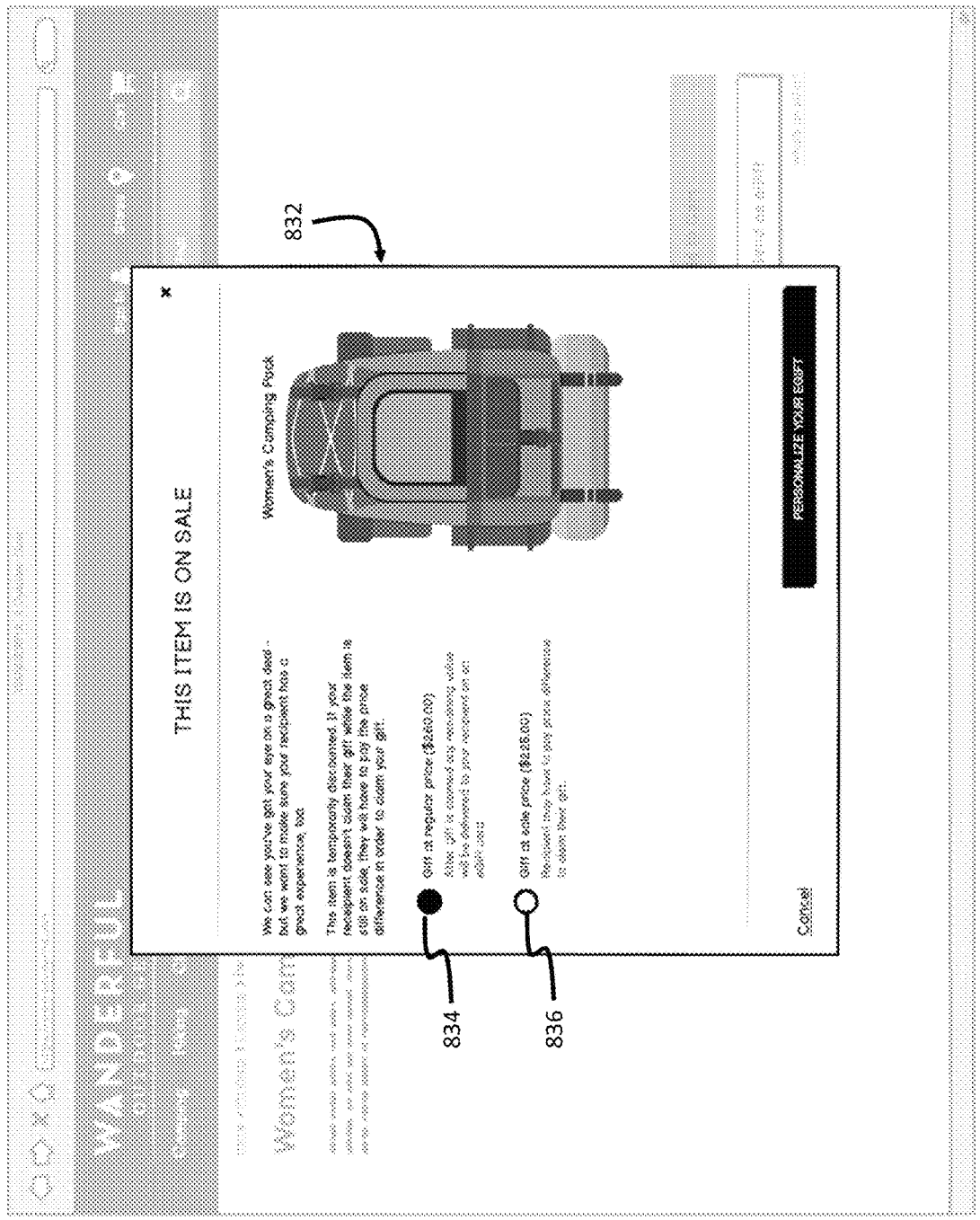
FIG. 8A is a screenshot of a sale notification screen in accordance with a preferred embodiment of the present invention.
Figure 8B:
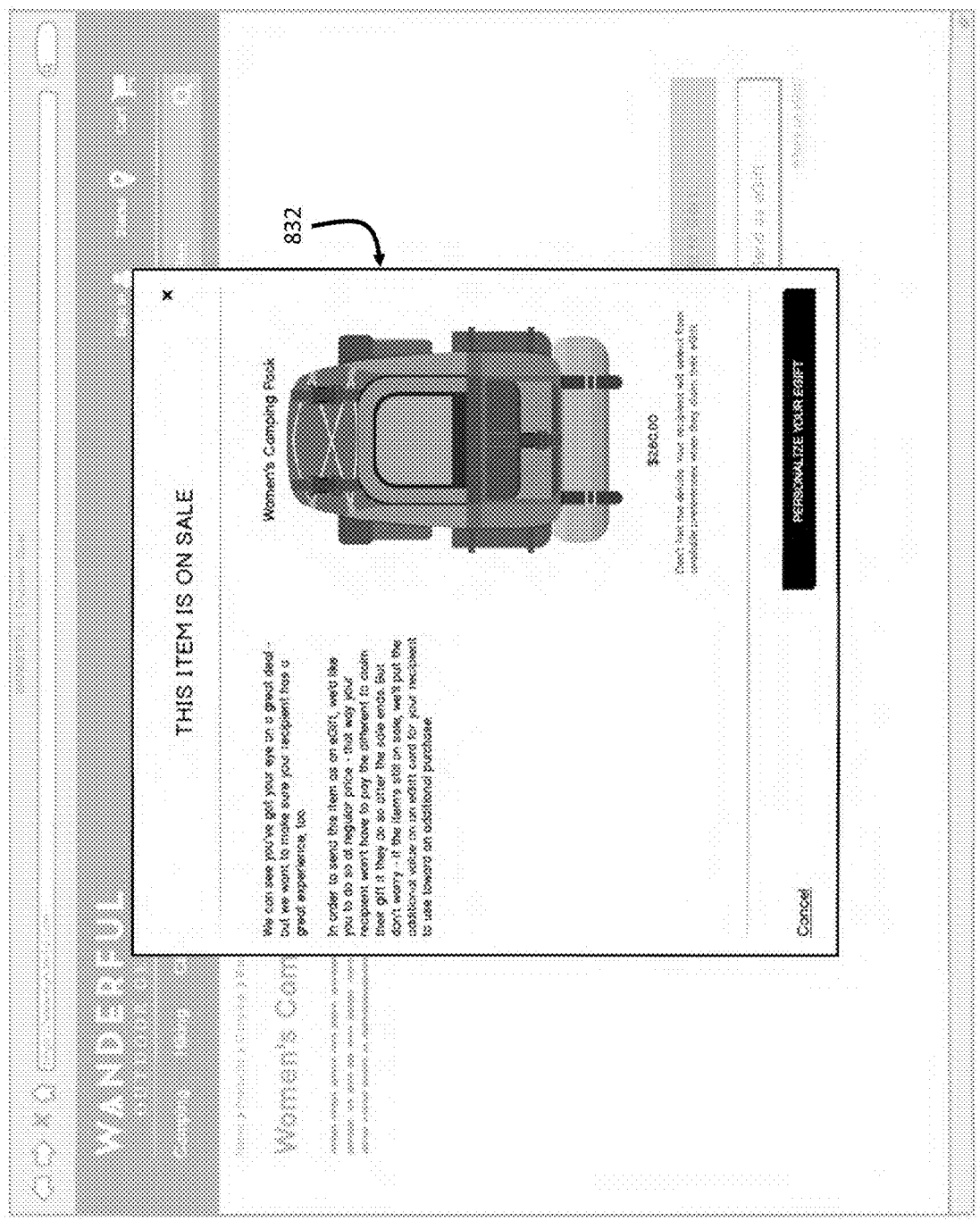
FIG. 8B is a screenshot of an alternative sale notification screen in accordance with a preferred embodiment of the present invention.

In some instances, the item to be purchased may be on sale at a discounted price. However, it is possible that the recipient will redeem the eGift after the sale has concluded. Thus, the purchaser is preferably given the option during the purchase procedure to pay the full value of the item. For example, FIG. 8A provides a sale notification window 832, with an explanation that the sale for the item may end before the gift is redeemed. Therefore, the sale notification window 832 preferably provides a button 834 that allows the purchaser to pay the full value of the item, or a button 836 which allows the purchaser to only pay the sale price. In an alternative embodiment, shown in FIG. 8B, the user is notified by the window 832 that the product is currently on sale, but that the eGift will be for the full purchase price to ensure the best experience for the recipient.

Figure 9:
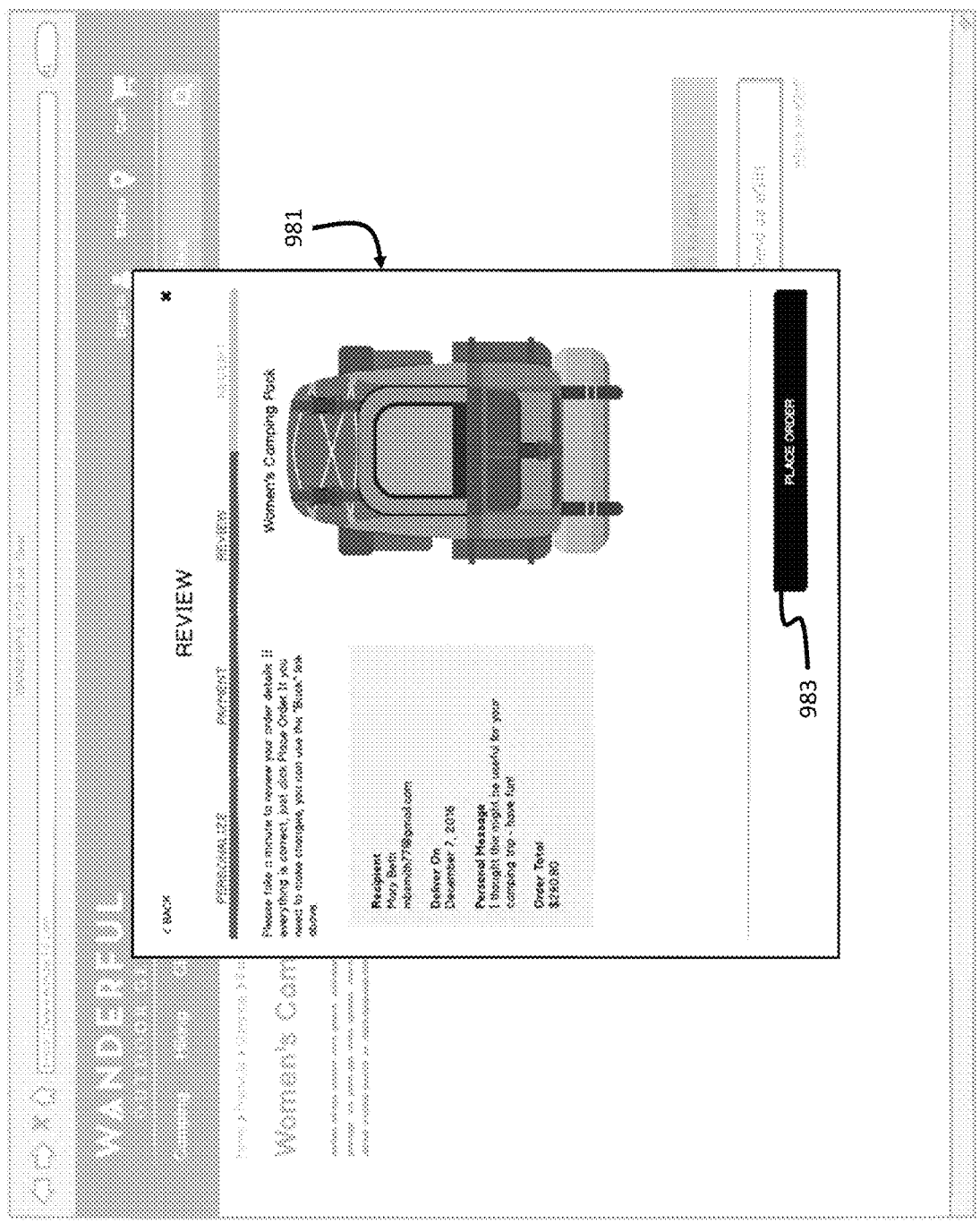
FIG. 9 is a screenshot of a purchase review screen in accordance with a preferred embodiment of the present invention.

FIG. 9 shows an optional review screen 981, which may be displayed upon completion by the purchaser of entry of all necessary information for the purchase transaction. The review screen 981 preferably allows the purchaser to review critical information, such as the recipient name and/or address, delivery date, message, order total, billing information, and the like, in order to ascertain whether any errors were made during entry. If all information is deemed to be correct by the purchaser, a button 983 is preferably provided for the purchaser to finally submit the order for processing.

Figure 10:
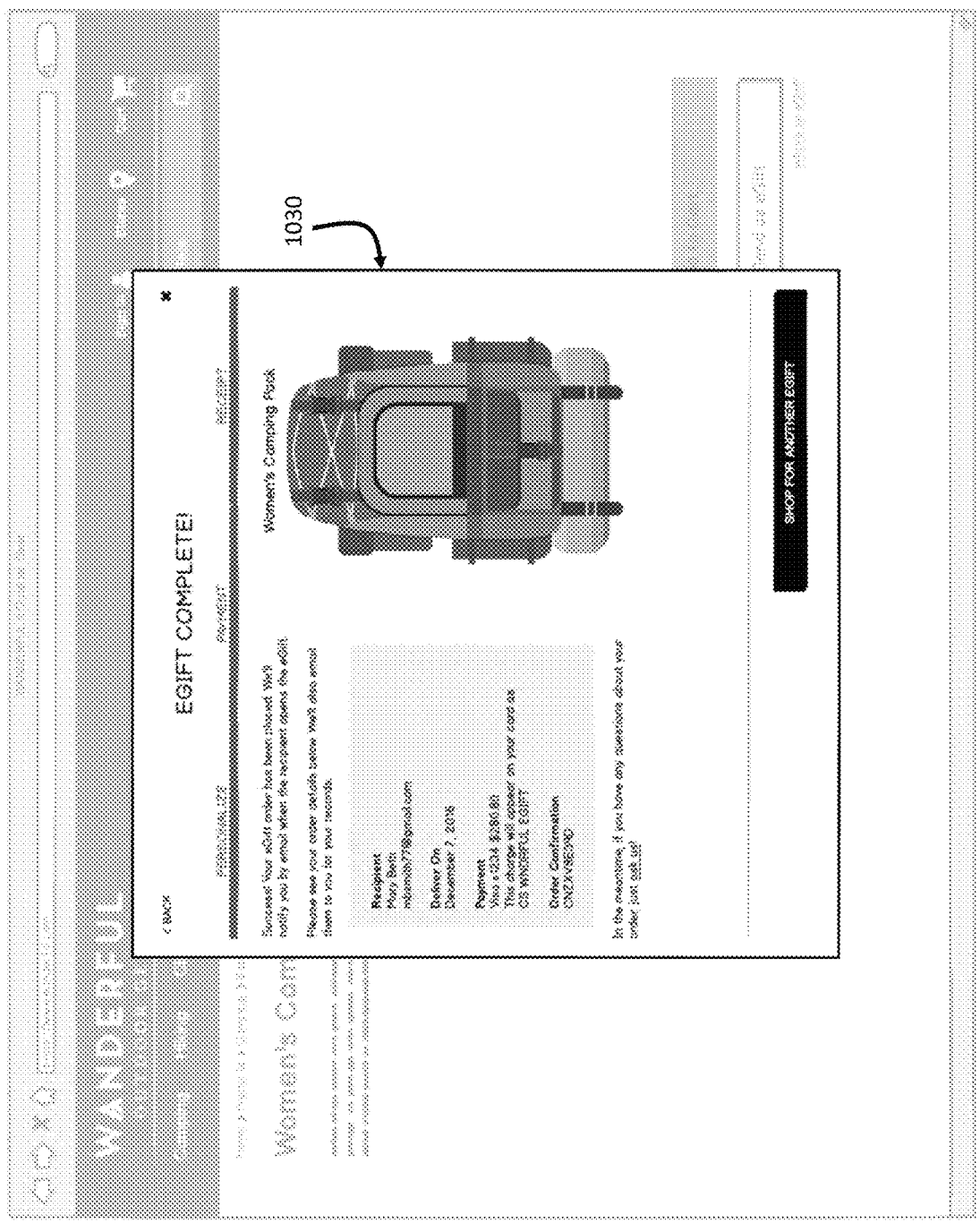
FIG. 10 is a screenshot of a confirmation screen in accordance with a preferred embodiment of the present invention.

At step 214, the service provider 110 determines whether the credit card information is authorized for the purchase. As part of this determination, the service provider 110 may also check as to whether the FINCEN daily limit for an individual cardholder (e.g., $10,000) will be exceeded by the purchase. If that is the case, the purchaser may receive an error message (not shown). If the credit card is otherwise not authorized, the purchaser is preferably returned to the billing information form 722. If the credit card is authorized, the purchaser is notified at step 216 of a successful transaction, which can be by way of a confirmation screen 1030 (FIG. 10) or the like.

Figure 2B:
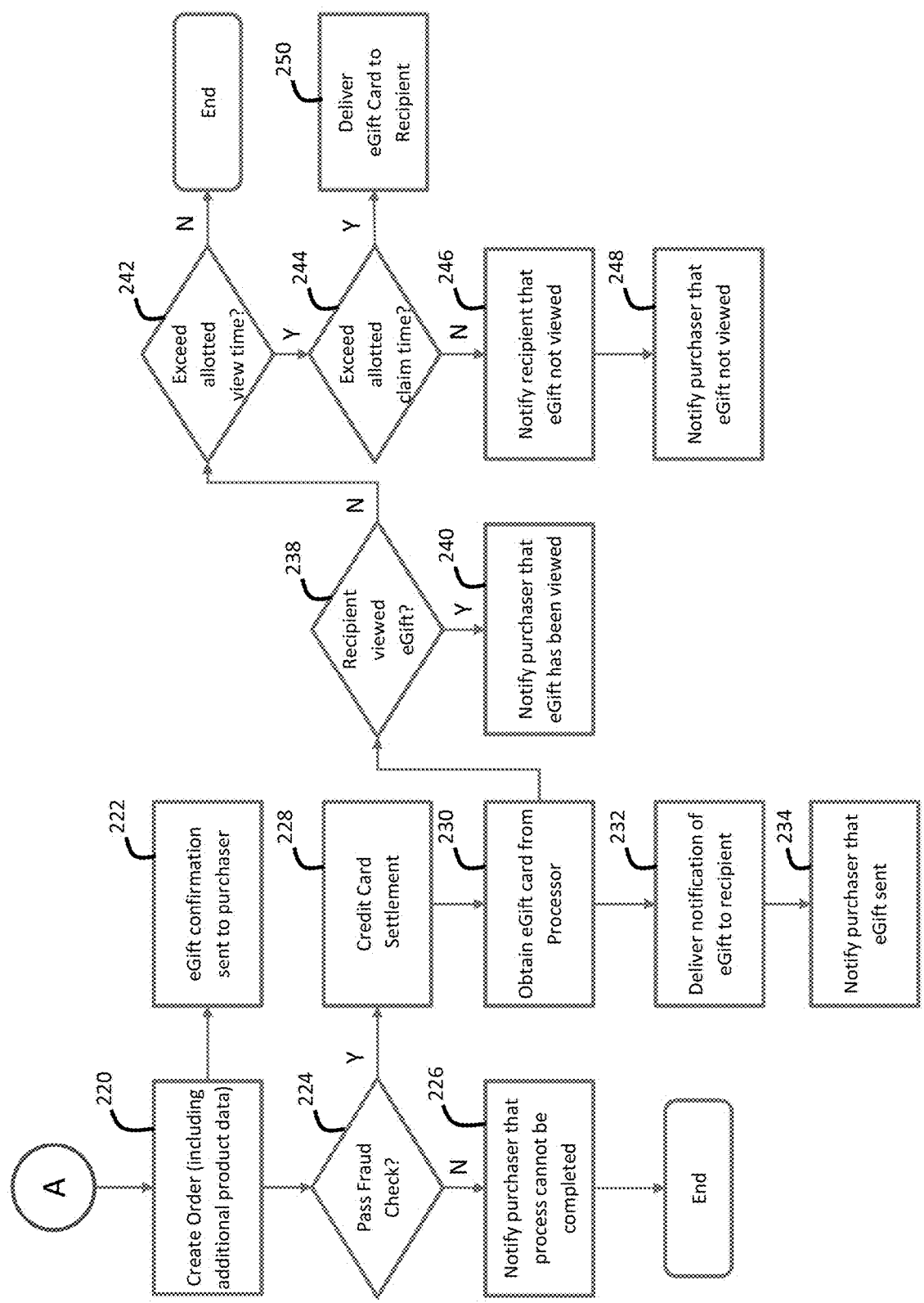

Once the transaction is complete, the purchaser device 106 is returned to the merchant site 400 at step 218. However, the service provider 110 undertakes additional steps, as shown in FIG. 2B, to finalize the purchase and generate the notice to the recipient. At step 220, the service provider 110 creates an order for the transaction, which preferably includes additional information about the selected item, such as the product name, the brand of product, an image of the product and the like for the purposes of representing the product to the recipient. At step 222, confirmation of the order is sent to the purchaser, preferably via email or the like. At step 224, a service provider fraud check is performed on the order. If the order fails the check, at step 226, the purchaser may be notified, again preferably via email, that the process cannot be completed.

If the order passes the fraud check, at step 228 the credit card payment is settled, with the funds being provided to the service provider 110. The appropriate funds are thereafter paid to the merchant 102 by the service provider 110 on mutually agreed upon terms. For example, the service provider 110 may make payments to the merchant on a periodic basis (e.g., monthly) to settle a number of transactions simultaneously. Payments may also be made per transaction, if desired.

Following settlement of the credit card payment, at step 230 an eGift card is obtained from the gift card processor 104. That is, the gift card processor 104 preferably issues a card number, access code, and/or PIN and associates the purchased balance therewith, and the information is transmitted to the service provider 110. This step, combined with the payment made to the merchant 102 by the service provider 110 alleviates some of the disadvantages described above with respect to conventional eGift programs. Specifically, a gift card is created and obtained shortly after the purchase is made, rather than at redemption by the recipient. Thus, an actual transaction occurs, rather than a purchase of "nothing." For this reason, the merchant 102 can receive the funds from the purchase without having to wait for redemption by the recipient.

Figure 11:
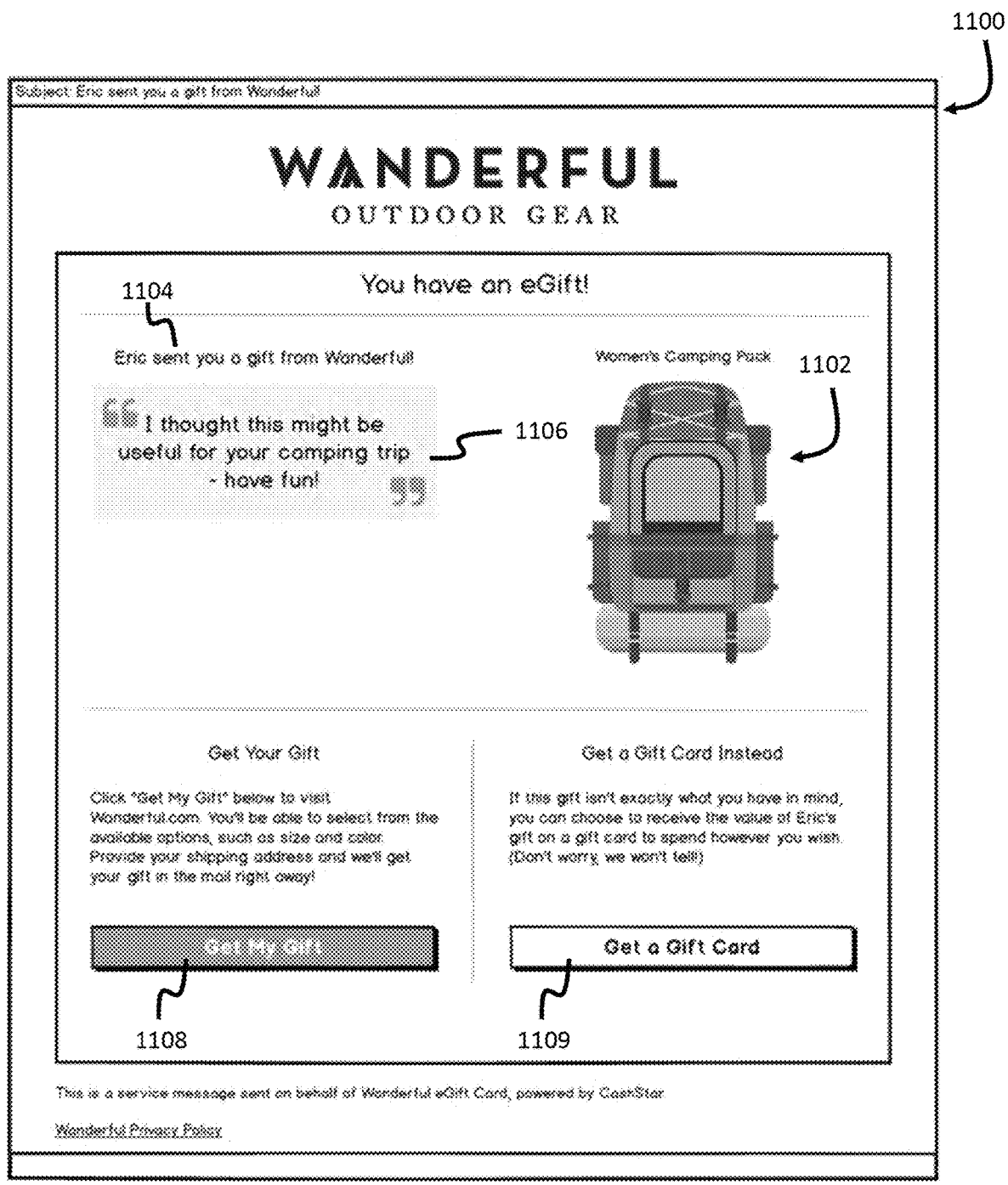
FIG. 11 is a screenshot of a notification email sent to a gift recipient in accordance with a preferred embodiment of the present invention.

Once the eGift card is obtained by the service provider 110, notification of the eGift is sent to the recipient device 108, preferably via email, at step 232. FIG. 11 shows an example email 1100 that is sent to the recipient as notification that a gift is waiting to be redeemed. The email 1100 preferably includes at least an image and/or description of the item 1102 selected by the purchaser as the gift, identification 1104 of the purchaser, any special message 1106 from the purchaser, and a redemption button 1108 which the recipient can select to redeem the gift. As seen in FIG. 11, the email preferably bears the name and branding of the merchant 102. While the preferred notification is shown as an email 1100, other methods of notification, such as text message, SMS, social media notification, or the like can be used as well. At step 234, a notification is also preferably sent to the purchaser that the recipient has received the eGift notice.

Figure 12:
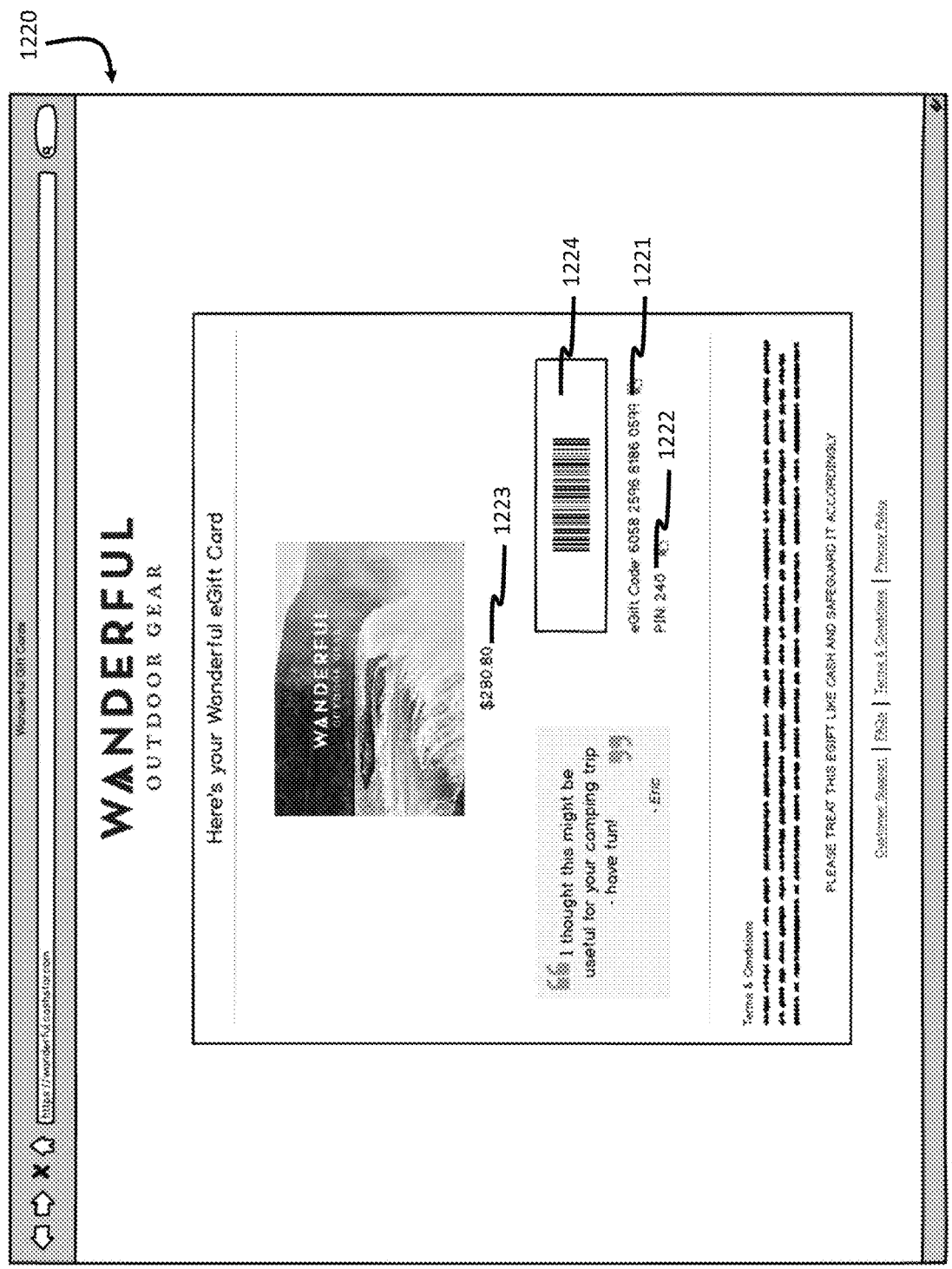
FIG. 12 is a screenshot of an eGift card page in accordance with a preferred embodiment of the present invention.

If the recipient does not like or want selected gift, the email 1100 may also provide a button 1109 that "converts" the gift into a gift card, which the recipient can redeem to obtain other products at the merchant's 102 website. In one example, shown in FIG. 12, selection of the gift card button 1109 may take the purchaser to a web page depicting an eGfit card 1220, preferably containing the branding of the merchant 102. The eGift card 1220 preferably provides the recipient with a gift code 1221 and PIN 1222 that can be entered at a later purchasing screen on the merchant's 102 website, the gift card amount 1223, and the like. A machine readable code 1224 containing this same information may also be provided, in the event that the merchant 102 allows the eGift card 1220 to be printable and redeemable in hard copy at a brick-and-mortar store. In other embodiments, rather than presenting an visual version of an eGift card, the card code 1221 and PIN 1222 may be securely transferred to the merchant's 102 website and applied at the time of purchase.

Figure 13:
FIG. 13 is a screenshot of an alternative notification email sent to a gift recipient in accordance with a preferred embodiment of the present invention.
Figure 14:
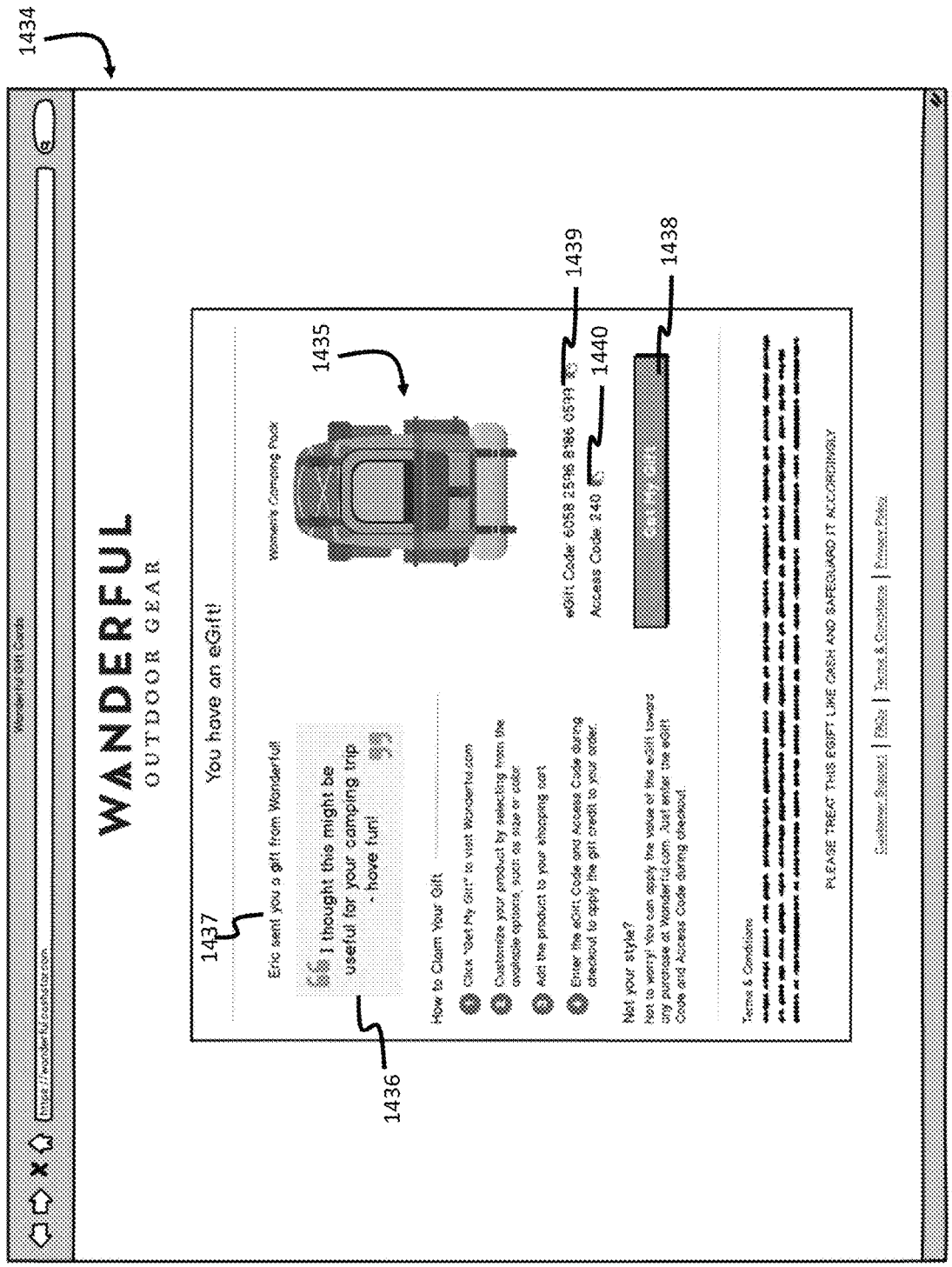
FIG. 14 is a screenshot of an alternative eGift card page in accordance with a preferred embodiment of the present invention.

FIG. 13 shows an alternative type of email 1330 that may be sent to the recipient. The email 1330 simulates a gift that may be "unwrapped" through selection of an unwrap button 1331. In this manner, the recipient can still receive the experience of surprise through "unwrapping." The email 1330 preferably includes the purchaser's message 1332 so that the recipient will know who the gift is from. Referring to FIG. 14, selecting the unwrap button 1331 opens a web page 1434, preferably including the branding of the merchant 102, which may provide at least an image and/or description of the item 1435 selected by the purchaser as the gift, identification 1436 of the purchaser, any special message 1437 from the purchaser, and a redemption button 1438 which the recipient can select to redeem the gift. In this embodiment, a gift code 1439 and PIN 1440 may also be provided to the recipient.

The service provider 110 periodically determines whether the eGift has been reviewed by the recipient at step 238. If so, the service provider 110 notifies the purchaser that the gift has been viewed at step 240. Otherwise, the service provider 110 determines whether the allotted view time has been exceeded at step 242. For example, a recipient may be given 30 days or the like in which to view the eGift, which can be accomplished by, for example, opening the notification email, viewing the gift on the merchant site, or the like. If the allotted time has not been exceeded, the process ends until the next required check at step 238. If the allotted view time is exceeded, the service provider 110 determines whether the allotted time within which to claim the eGift has been exceeded at step 244. The claim time is preferably longer than the view time, although both could be identical. If the allotted claim time has not expired, at step 246 the service provider 110 sends a notice to the recipient that the waiting eGift has not been viewed. Similarly, at step 248, the purchaser may be notified of the same, which may encourage the purchaser to contact the recipient to alert the recipient to the existence of the gift. If the allotted claim time has been exceeded, at step 250, the service provider 110 sends a notice that the value of the gift is now available on an eGift card. That is, the selected item is no longer redeemable unless the recipient independently chooses the item from the merchant site and applies the gift card balance as payment.

Figure 3A:
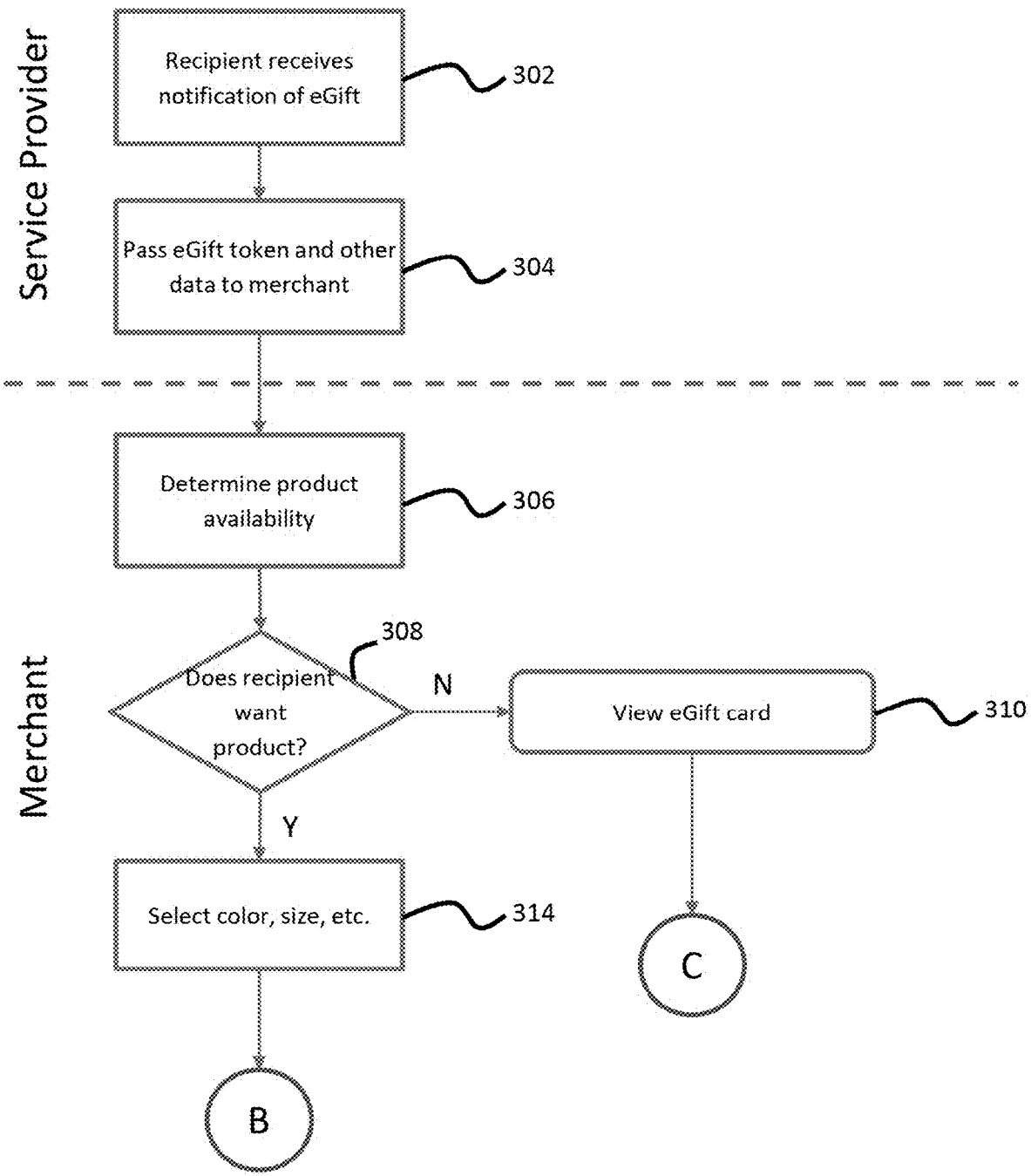
FIGS. 3A and 3B are flow diagrams illustrating a method of redeeming an eGift in accordance with a preferred embodiment of the present invention.
Figure 3B:
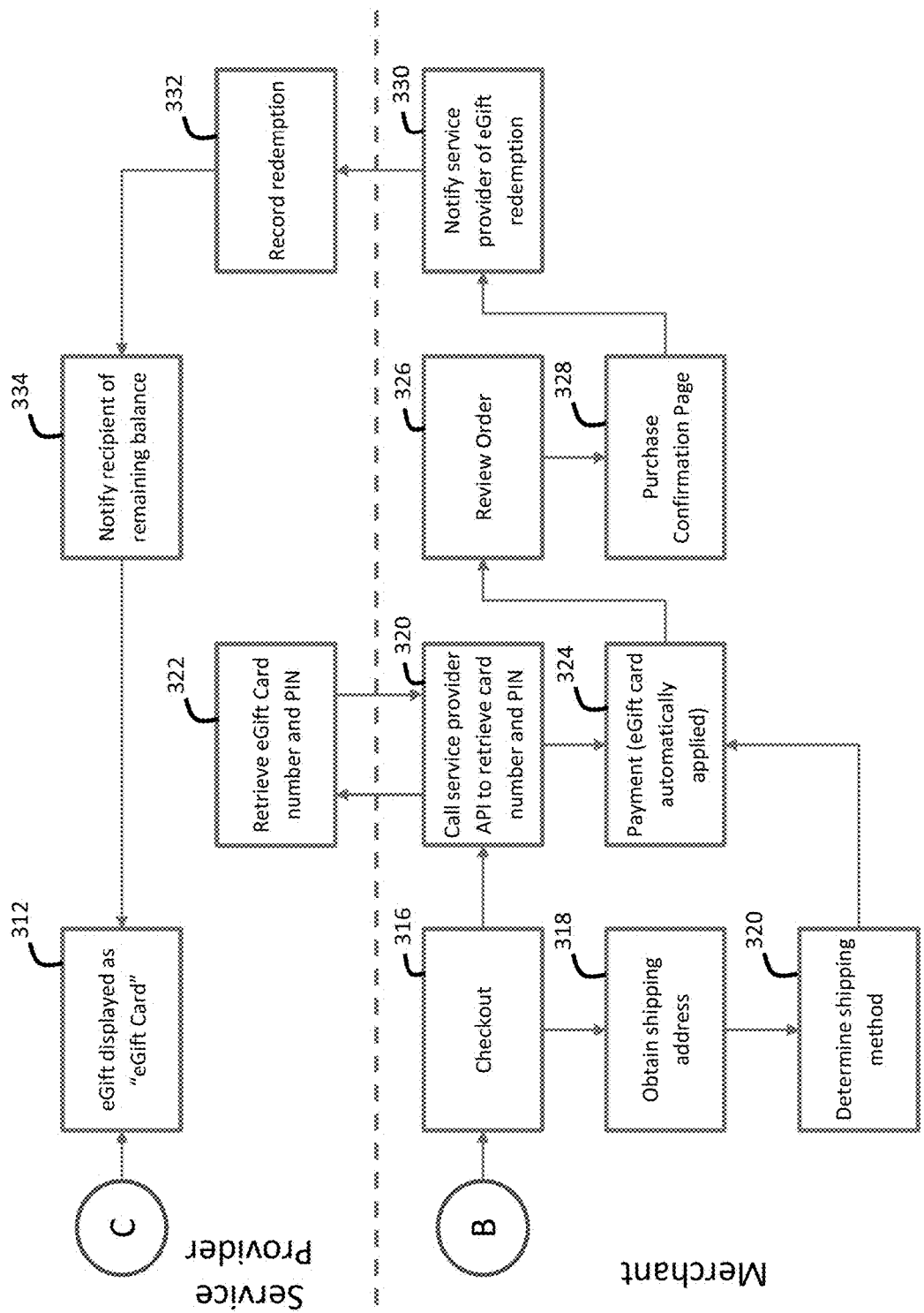

FIGS. 3A-3B show an exemplary redemption process in accordance with an embodiment of the present invention. At step 302, the recipient receives, via the recipient device 108, notification of the eGift, as described above. For example, the email 1100 shown in FIG. 11 can serve as such a notification. When the recipient clicks on the button 1108 to redeem the gift, the recipient is preferably taken to the website of the merchant 102, as opposed to a site run by the service provider 110. In order to facilitate the transaction, when the recipient seeks to redeem the gift, the service provider 110, at step 304, passes an encrypted token related to the eGift card to the merchant 102.

Figure 15:
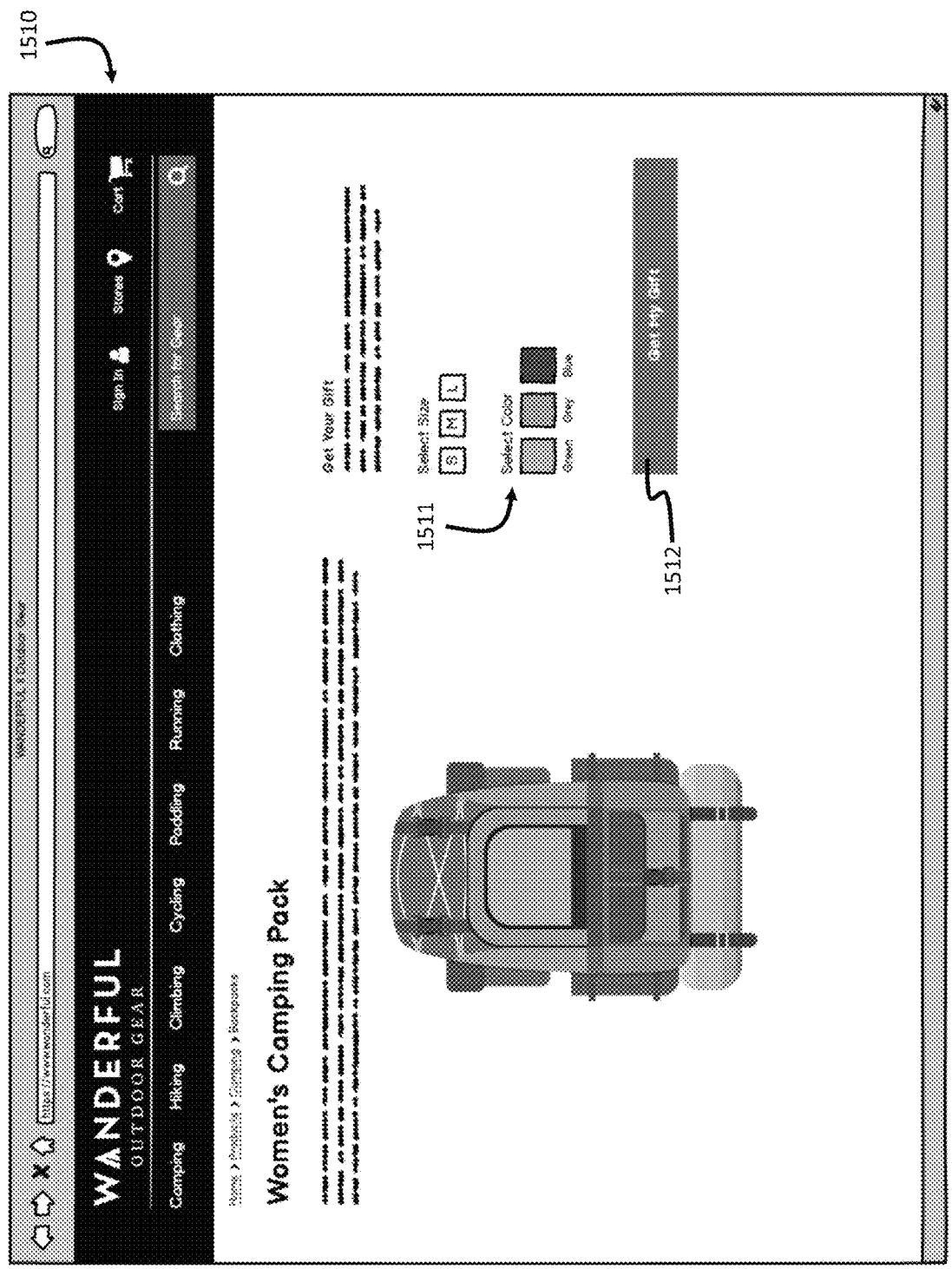
FIG. 15 is a screenshot of a merchant gift page in accordance with a preferred embodiment of the present invention.

The first step 306 taken by the merchant 102 is to determine the availability of the selected item, since some time may have passed between purchase and redemption. If the product is not available, the merchant 102 may notify the recipient that the value of the gift is available in the form of an eGift card, and the recipient may shop on the site of the merchant 102 to select new items. Assuming the selected item is available, FIG. 15 shows a gift page 1510 that can be displayed on the recipient device 108. The gift page 1510 preferably provides a button 1512 for accepting the selected gift. In the event the received email does not provide the recipient with an option to select something else in place of the purchaser's selected gift item, or in addition thereto, the recipient may be provided on the gift page 1510 with such an option (not shown). Thus, the merchant 102 may receive an input from the recipient at step 308 as to whether the recipient wants the selected item. If not, at step 310 the gift is presented to the recipient as an eGift card for the balance, and the recipient may shop on the site of the merchant 102 to select new items. Thereafter, the service provider 110 at step 312 displays the eGift as an eGift card (e.g., eGift card 1220). As described above, step 308 may be made sooner, such as at the email stage, rather than on the merchant's 102 website.

If the recipient opts to receive the selected item, such as by selecting button 1108 in the email 1100 (FIG. 11), at step 314, the gift page 1510 preferably provides the recipient with any options 1511 for the item that may be selected, such as color, size, or other like variables. Once the recipient has selected the proper parameters for the gift, the item is added to the shopping cart through the selection of the button 1512. The recipient may add other items to the shopping cart before beginning checkout at step 316. In some embodiments, however, the shopping cart may be bypassed completely and the recipient may proceed straight to checkout. At step 318, the merchant 102 preferably confirms or obtains a shipping address for the recipient.

At step 320, the merchant 102 calls a service vendor API to retrieve the eGift card number and PIN and/or access code, which are sent back by the service provider 110 at step 322. Alternatively, eGift card details can be securely passed between the service provider 110 and the merchant 102 using JavaScript Object Notation Web Token (JWT) or similar functionality. For example, the merchant 102 and the service provider 110 may have previously exchanged encryption keys and/or other credentials prior to the eGift card transaction. Thus, at step 304, the service provider 110 may securely transfer encrypted data related to the eGift card to the merchant 102, which would use the previously established encryption key to decrypt the received data. In this instance, step 320 may be omitted.

Preferably, at step 324, once the recipient completes the appropriate shipping steps 318, 320, payment for the selected item is automatically applied using the retrieved eGift card. To the extent the eGift card balance is insufficient to cover the eGift cost, such as in the case where the item was gifted at a discounted price or the recipient has chosen to add additional items to the shopping cart, the recipient is preferably prompted to input additional billing information to cover the overage.

Following application of the eGift card, the merchant 102 at step 326 gives the recipient an opportunity to review the order to ensure everything is correct. If so, the merchant 102 at step 328 displays a purchase confirmation page to the recipient, confirming the order and providing details of shipment and the like. At step 330, the merchant 102 proceeds to notify the service provider 110 of redemption of the eGift. Preferably, the notification will include the amount of the gift card that was actually used in the transaction. At step 332, the service provider 110 records the redemption for its records.

In the event that less than all of the funds available on the eGift card are used to redeem the originally selected gift, such as if the item was on sale at the time of redemption, the service provider 110 preferably determines a remaining balance. At step 334, the service provider 110 notifies the recipient of the remaining balance, preferably via an email or the like. The remaining balance is preferably displayed as an eGift card, similar to step 312. In some embodiments, if the remaining balance is less than a certain amount (for example, less than $4), the merchant 102 may determine how to treat the balance. For example, the remaining balance may be donated, rounded-up, or disposed of in another like manner. In some embodiments, the merchant 102 may grant the recipient the option of what to do with the remaining de minimis amount.

Figure 16:
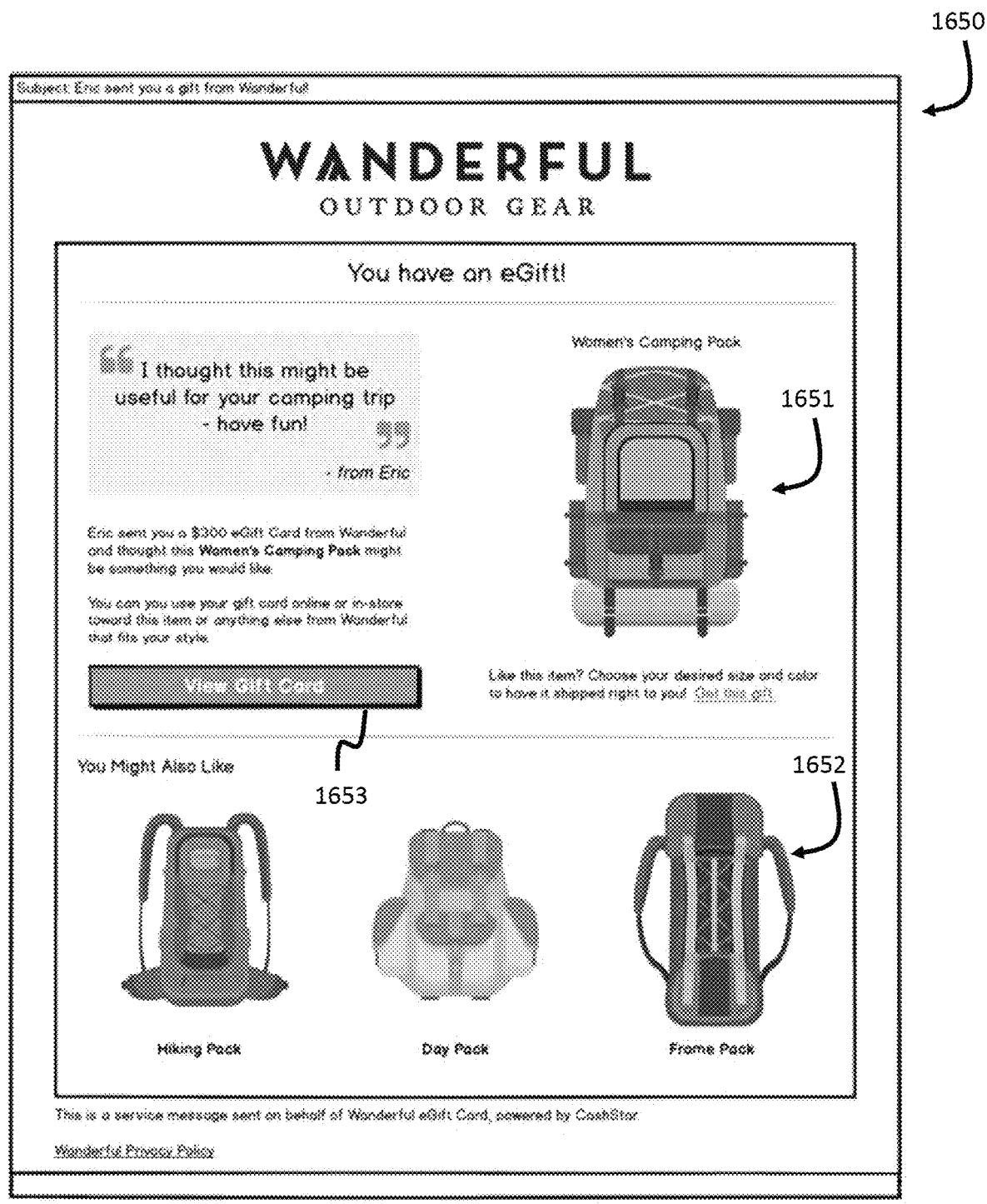
FIG. 16 is a screenshot of an alternative notification email sent to a gift recipient along with a listing of additional recommended products in accordance with a preferred embodiment of the present invention.

FIG. 16 shows an alternative email 1650 that may be sent to the recipient. In addition to an image and/or description of the item 1651 and other information discussed above, the email may also contain recommendations 1652 for additional and/or alternative products. In this manner, the recipient may be presented with alternatives if the gift selected by the purchaser is not satisfactory, but the recipient is nevertheless looking for something similar or related thereto. Preferably, when recommendations 1652 are provided, the email includes a button 1653 to allow the user to view the gift card, although buttons similar to those described above can also or alternatively be used.

Figure 17A:
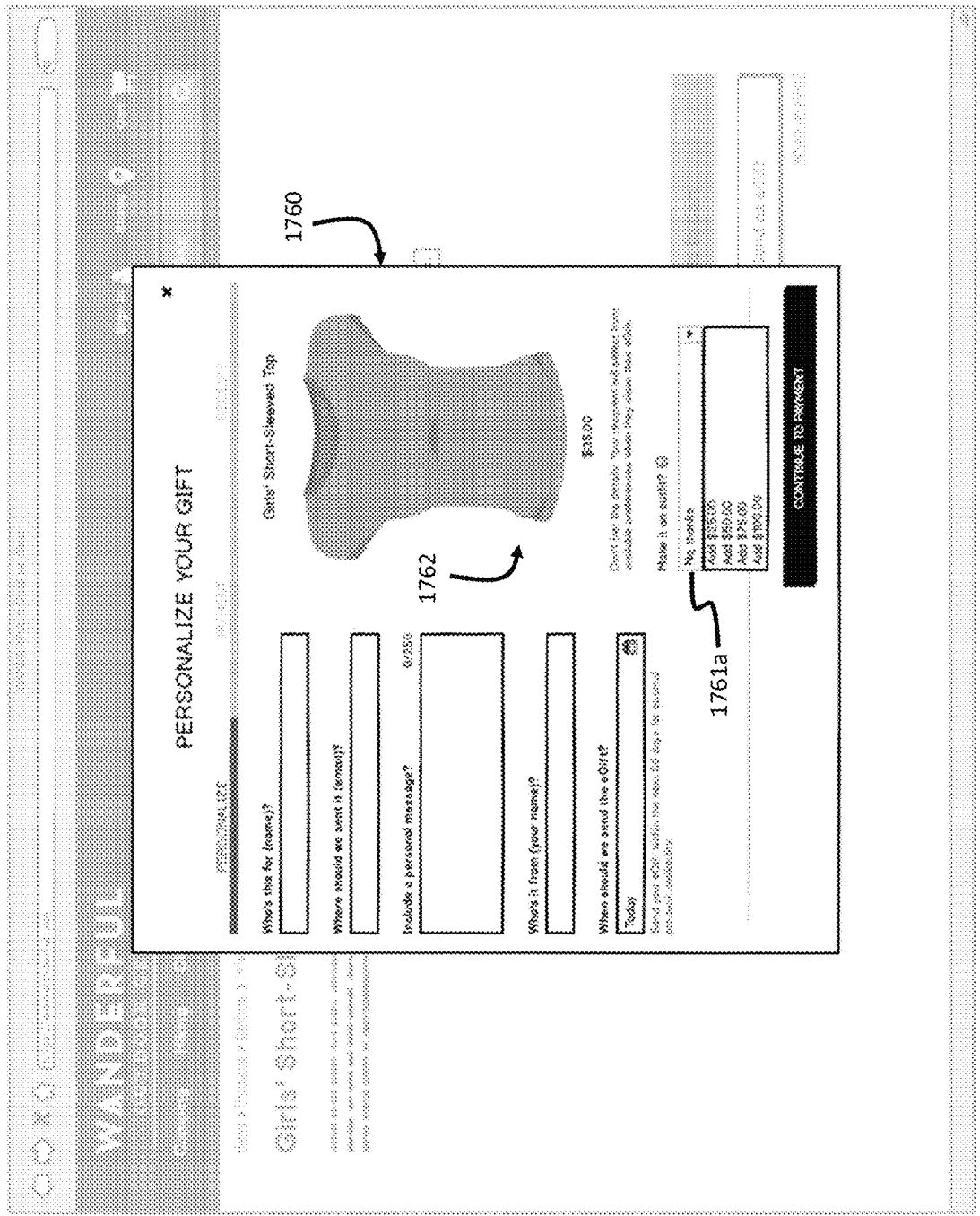
FIGS. 17A-17C are screenshots of various alternative recipient information forms enabling the purchaser to add value to the gift in accordance with preferred embodiments of the present invention.
Figure 17B:
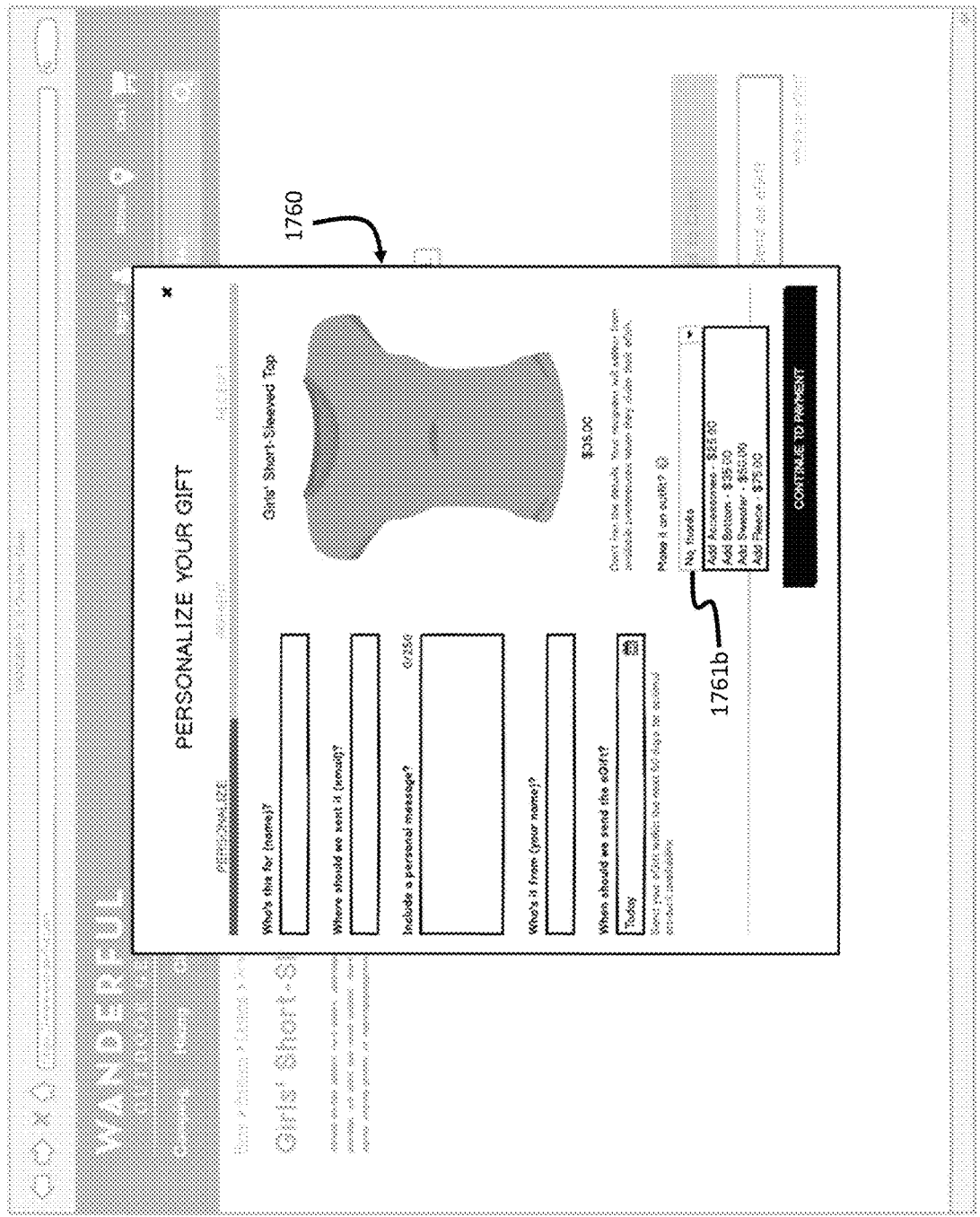
Figure 17C:
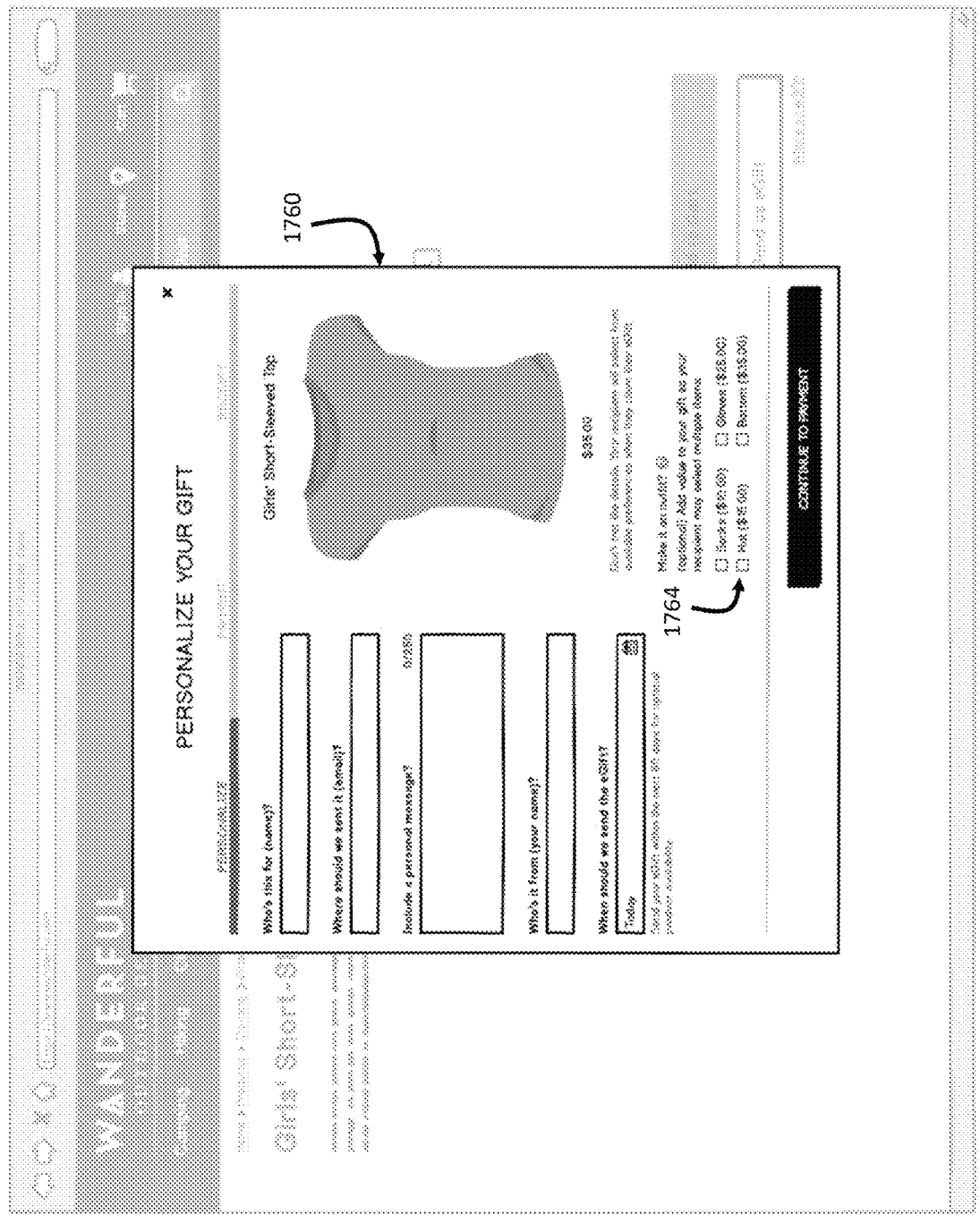

Embodiments of the present invention are also not limited to selecting and sending a single gift. There are preferably options for the user to select multiple gifts and/or additional funds for the eGift card. FIG. 17A, for example, is an alternative recipient information page 1760 that includes a drop-down box 1761a where the purchaser can add additional funds in varying amounts to the gift such that the recipient could obtain the selected item 1762 and shop for additional items at the website of the merchant 102. FIG. 17B is slightly different, in that the drop-down box 1761b assigns values to particular related items, such as pants, accessories, or the like that can be paired with a shirt to make an outfit, as one example. As another example, in FIG. 17C, the drop-down box is replaced with a series of check boxes 1764 which allow the purchaser to make similar selections.

Figure 18:
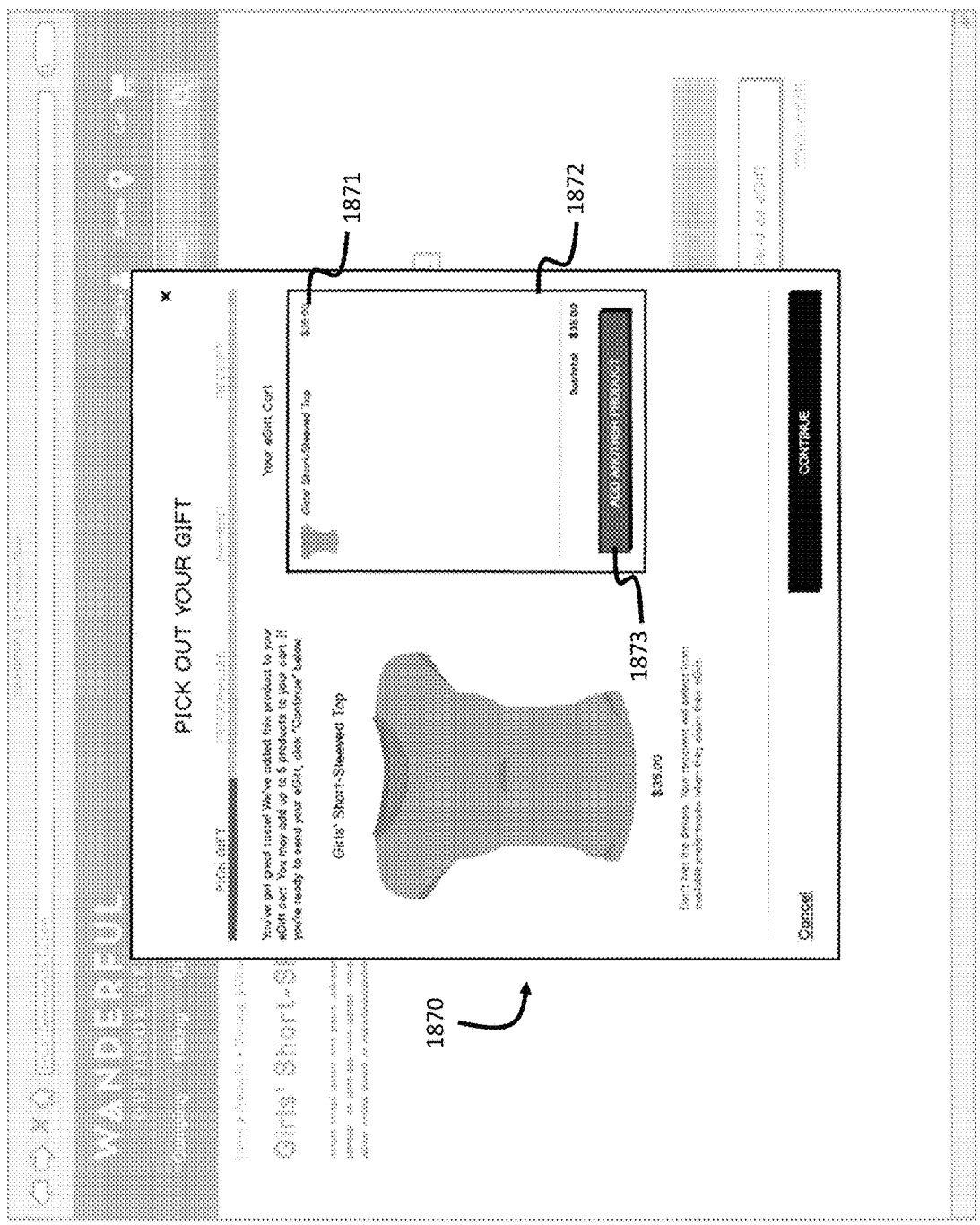
FIG. 18 is a screenshot of a gift selection screen providing the purchaser with the option to add another product to the gift in accordance with a preferred embodiment of the present invention.
Figure 19:
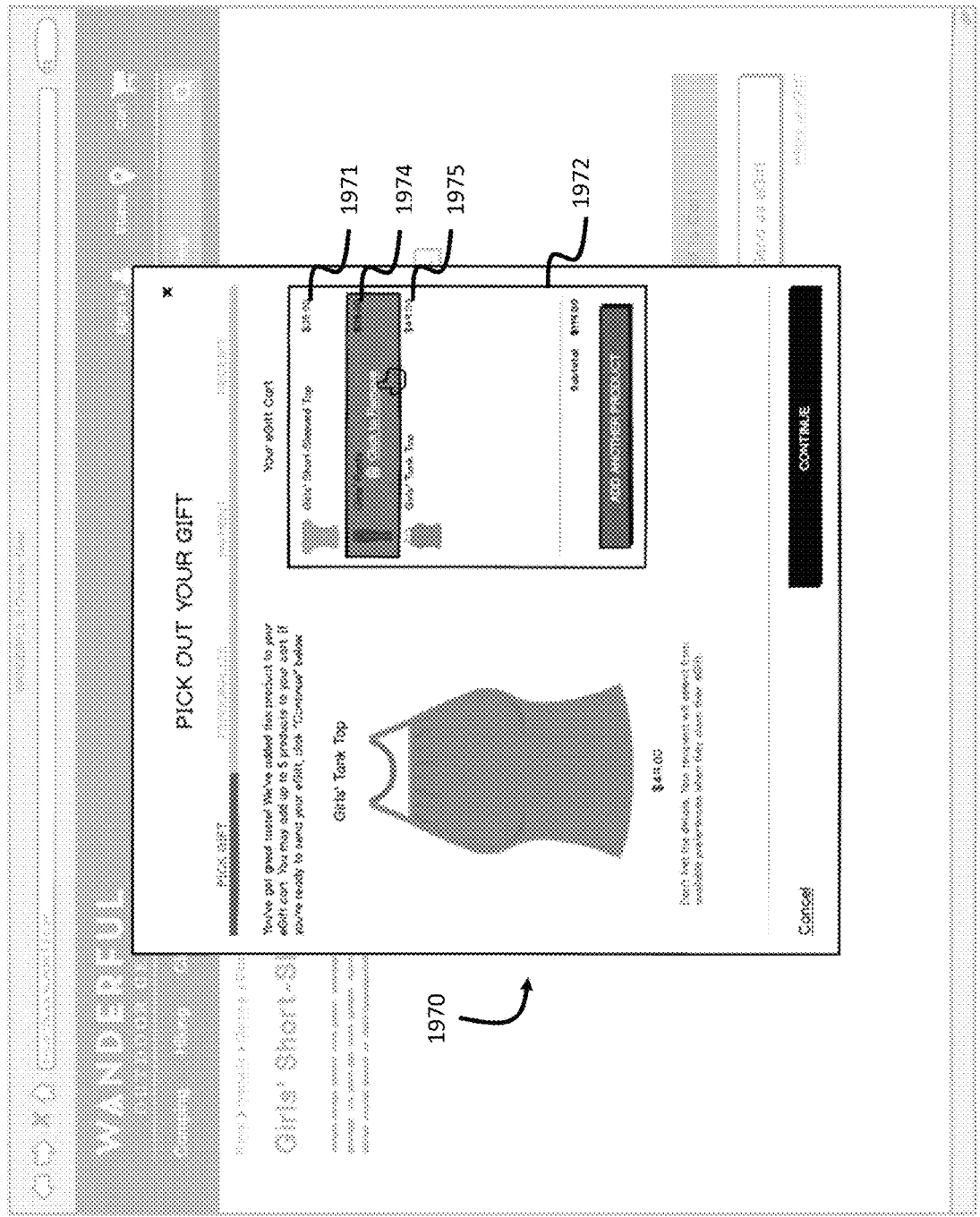
FIG. 19 is a screenshot of the gift selection screen of FIG. 18 following the addition of other products to the gift in accordance with a preferred embodiment of the present invention.
Figure 21:
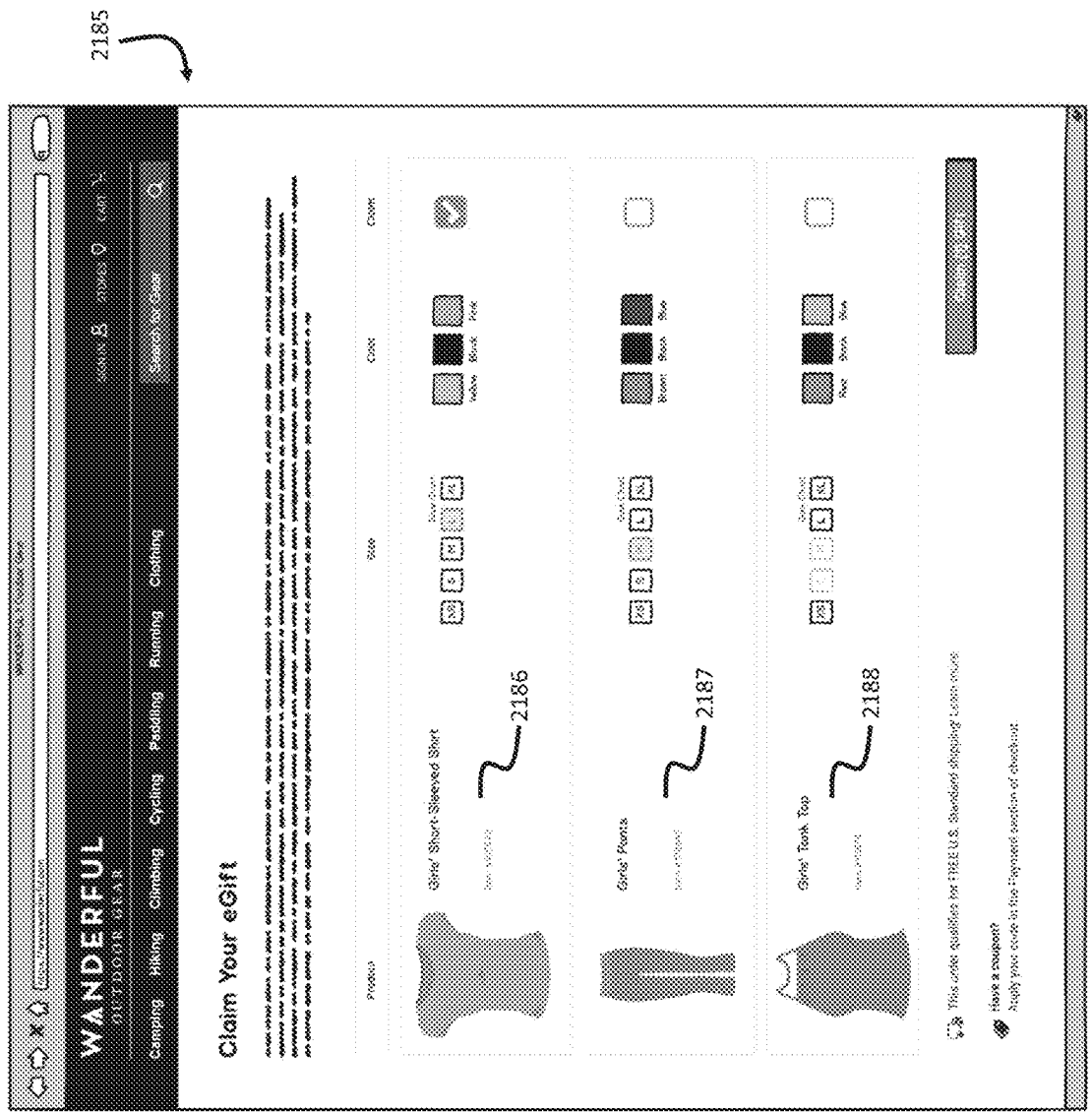
FIG. 21 is a screenshot of a merchant gift page presenting multiple gifts for selection in accordance with a preferred embodiment of the present invention.

Rather than providing mere additional funds and suggestions to the gift, the purchaser may able to select multiple gifts to send. FIG. 18 shows a gift selection screen 1870 wherein a first item 1871 has already been selected, as described in the processes above. A gift cart 1872 is preferably depicted on the page to show all of the items selected by the purchaser. A button 1873 is preferably also provided that allows the purchaser to return to browse the merchant's 102 website to select another item to send as a gift. FIG. 19 then shows a subsequent view of the gift selection screen 1970, wherein the gift cart 1972 now includes first, second, and third selected items 1971, 1974, 1975. Once in the cart 1972, the purchaser also preferably has the option to remove any of the previously selected items 1971, 1974, 1975, if necessary.

Figure 20:
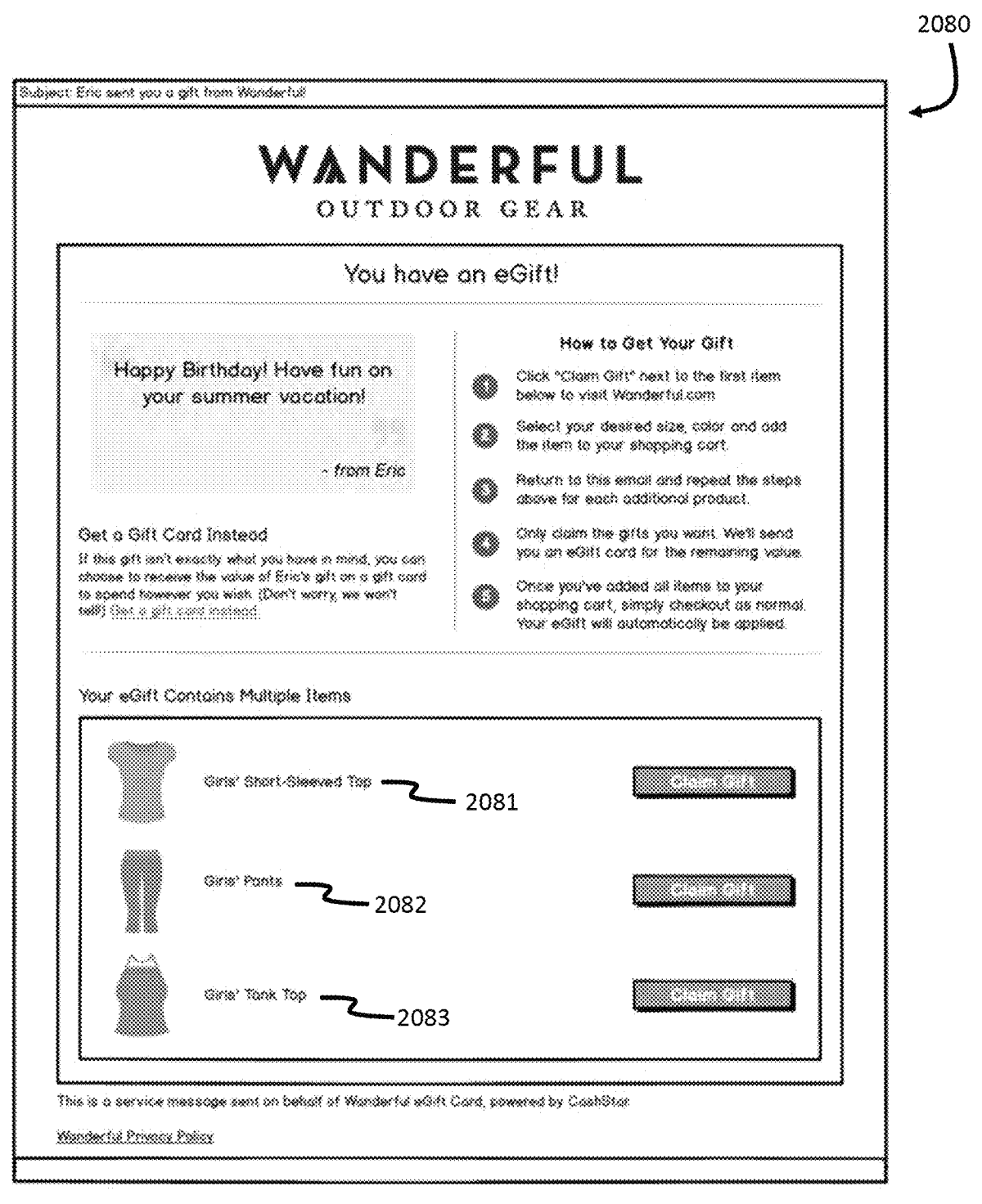

FIG. 20 is an exemplary email 2080 to the recipient that preferably shows each of the three selected items 2081, 2082, 2083. It is preferred that each item 2081, 2082, 2083 may be claimed individually, such that the recipient can choose which are desired and which may be exchanged. Alternatively, the email 2080 need not provide individual claiming options, but may redirect the recipient to a gift page 2185 that permits the recipient to select which items 2186, 2187, 2188 to claim. Where applicable, for each of the gift items 2186, 2187, 2188, the recipient is preferably permitted to select various parameters, such as size, color, and the like.

Figure 22:
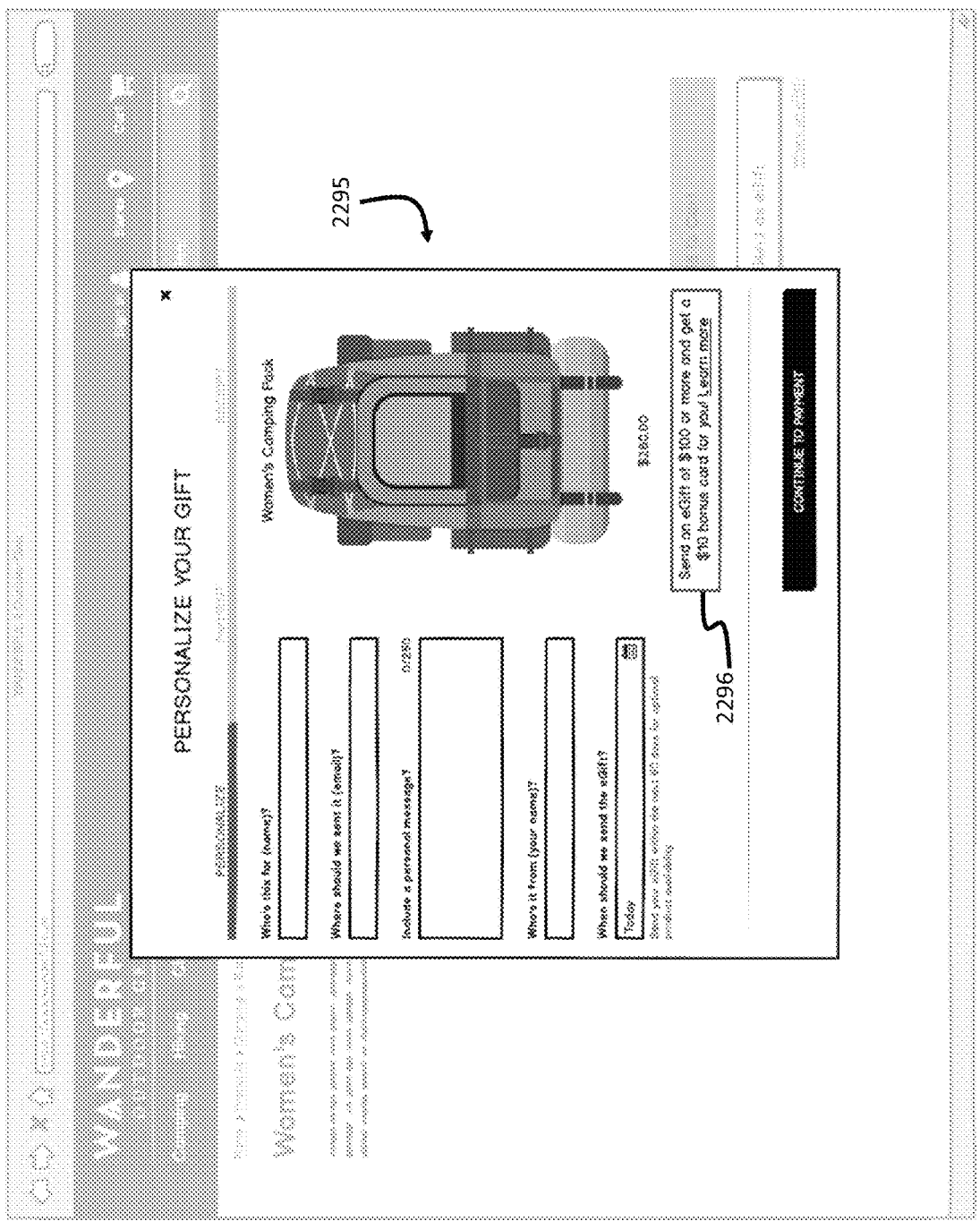
FIG. 22 is a screenshot of an alternative recipient information form providing a promotional message in accordance with a preferred embodiment of the present invention.
Figure 23:
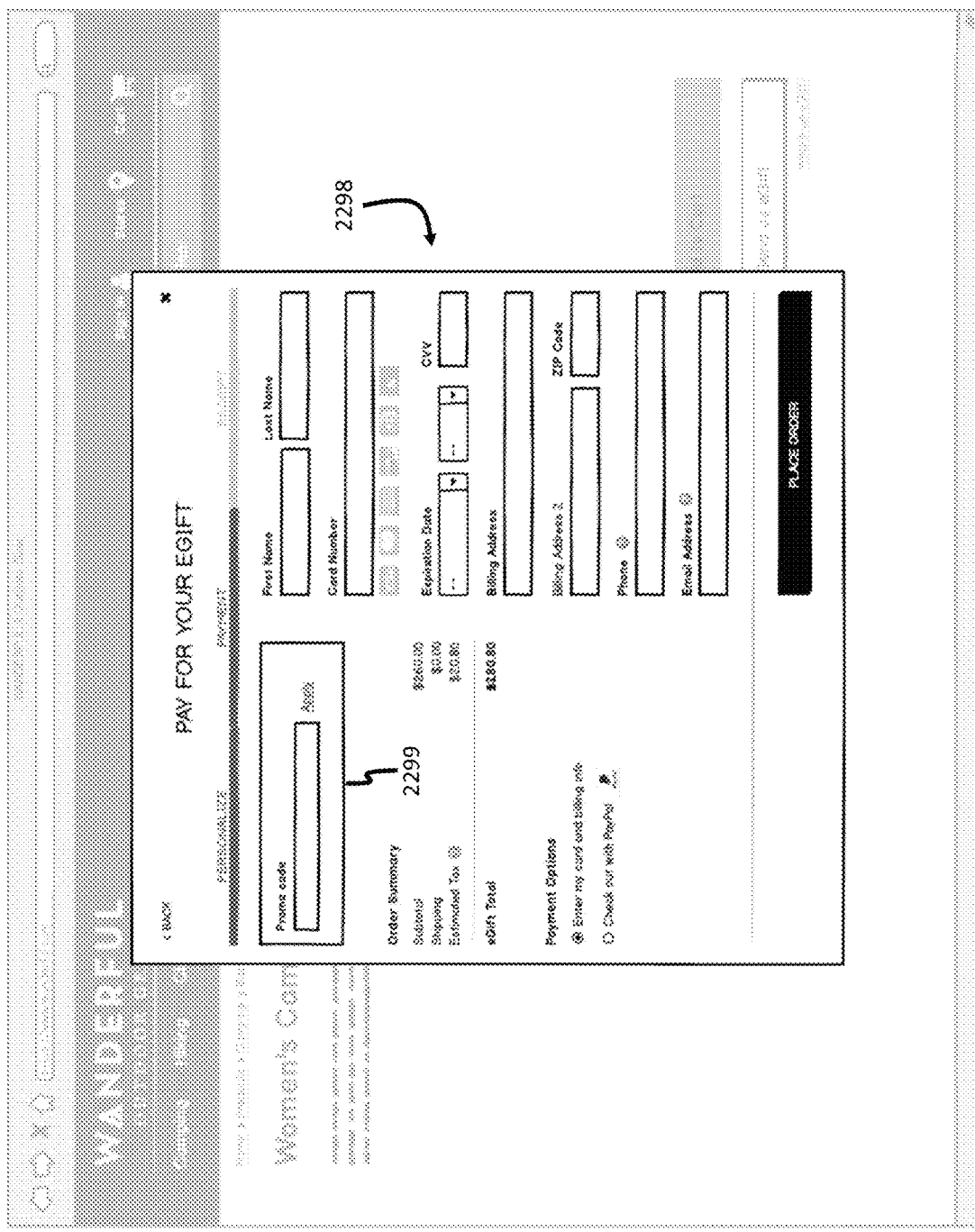
FIG. 23 is a screenshot of an alternative billing information form with a portion for entering a promotional code in accordance with a preferred embodiment of the present invention.

In some embodiments, promotional support can be added to incentivize purchasers to utilize the eGift system. For example, FIG. 22 shows a recipient information page 2295 with a notification 2296 that giving an eGift of a certain amount can result in rewards. In the example of FIG. 22, the reward is an additional card of a given amount to that is issued to the purchaser. However, other rewards can include adding more funds to the eGift amount, discounting an item price, or the like. For example, a promotional discount code may be provided as a reward, which the purchaser can then redeem on a subsequent purchase at the merchant's 102 website or brick-and-mortar store. In one example, a payment screen 2399 of FIG. 23 may include a text box 2398 for the purchaser to provide a promotional code with the intent of receiving a reward for the eGift purchase.

Figure 24:
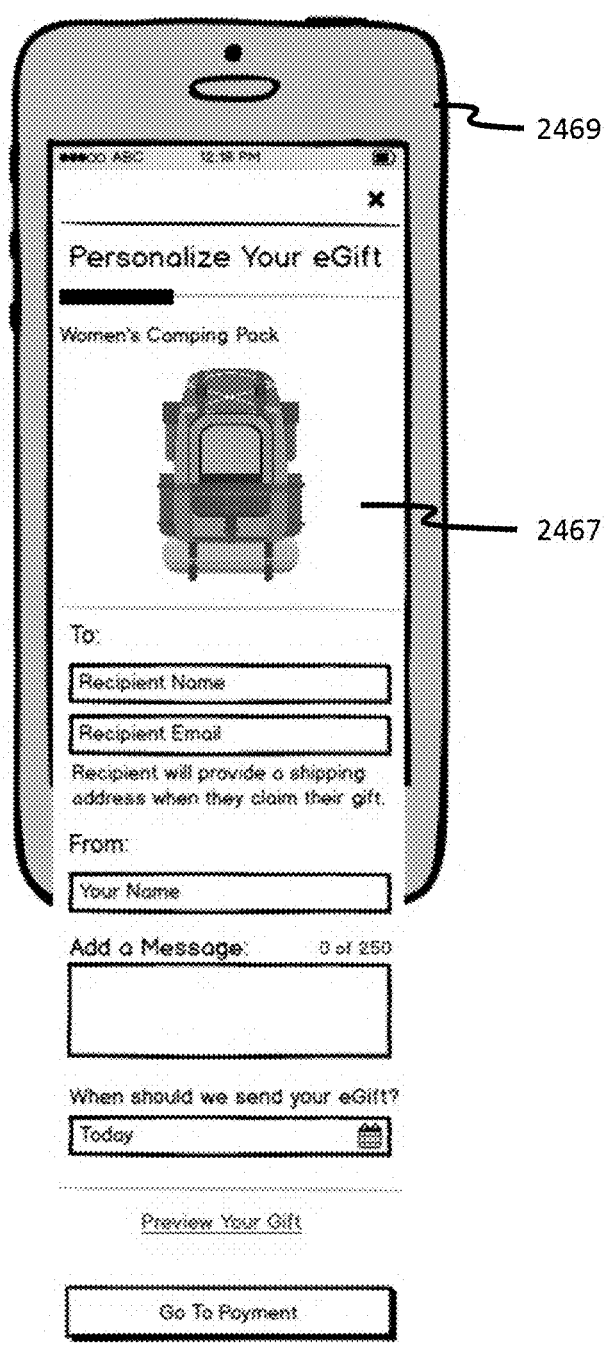
FIG. 24 is a screenshot of a recipient information form on a mobile device in accordance with a preferred embodiment of the present invention.

It should further be noted that the pages and sites described herein are preferably adaptable to the type of display on which they are viewed. For example, the pages are preferably optimized for mobile device viewing. FIG. 24 provides one example of a recipient information page 2467 which has been formatted for display on a mobile device 2469.

Those skilled in the art will recognize that boundaries between the above-described steps are merely illustrative. Multiple steps may be combined into a single step, a single step may be distributed in additional steps and steps may be executed at least partially overlapping in time. Further, alternative embodiments may include multiple instances of a particular step, and the order of steps may be altered in various other embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for allowing a purchaser to purchase an electronic gift for a recipient, the method comprising:
   providing, by a service provider, code to a merchant that, when selected by the purchaser using a purchaser device, opens an overlay on a website of the merchant, the code being selected in association with at least one item available for sale on the merchant web site;
   receiving, by the service provider, information about the recipient, including at least an email address of the recipient, the information about the recipient being provided by the purchaser using the purchaser device accessing the overlay;
   receiving, by the service provider, billing information, including at least electronic payment information, the billing information being provided by the purchaser using the purchaser device accessing the overlay;
   receiving, by the service provider, payment, in an amount at least equal to a purchase price of the at least one item, based on the billing information;
   obtaining, by the service provider from a gift card processor, an electronic gift card having at least a unique gift card number and a balance at least equal to the purchase price of the at least one item;
   after the electronic gift card has been obtained, electronically notifying, by the service provider, the recipient that the electronic gift has been purchased by the purchaser, the notification being viewable by the recipient on a recipient device and including at least an identification of the at least one item and a link to the website of the merchant to enable the recipient to interact directly with the merchant to redeem the at least one item;
   receiving, by the service provider from the merchant, a request for data related to the electronic gift card in order to apply payment for the at least one item to be redeemed; and
   sending, by the service provider to the merchant, the requested electronic gift card data.

2. The method of claim 1, further comprising determining, by the service provider, whether the recipient has claimed the at least one item within a predetermined period of time.

3. The method of claim 2, wherein when the service provider determines that the predetermined period of time has lapsed before the recipient has claimed the at least one item, presenting the recipient with the electronic gift card.

4. The method of claim 1, wherein the notification is sent from the service provider by email to the recipient's email address.

5. The method of claim 4, further comprising sending, by the service provider, of an additional message to the recipient by an SMS message.

6. The method of claim 1, further comprising sending, by the service provider, the gift card number to the merchant in response to an API call by the merchant.

7. The method of claim 1, further comprising passing, by the service provider, an encrypted token related to the electronic gift card to the merchant upon receiving an indication that the recipient intends to claim the at least one item.

8. The method of claim 1, wherein the notification provides an option to the recipient to either redeem the electronic gift in the form of the at least one item or in the form of the electronic gift card for the balance.

9. The method of claim 1, further comprising providing, by the service provider, an option to the purchaser to increase the balance to include funds equal to at least one of an estimated tax on the at least one item or a shipping cost for the at least one item.

10. The method of claim 1, further comprising providing, by the service provider, an option to the purchaser to, when the at least one item is on sale, select whether to pay a full price for the at least one item or a sale price for the at least one item.

11. The method of claim 1, wherein the received request for the electronic gift card data is made via an API call to the service provider.

* * * * *